(12) United States Patent
Xu et al.

(10) Patent No.: US 12,537,085 B2
(45) Date of Patent: Jan. 27, 2026

(54) CONSTRUCTION METHOD, PREDICTION SYSTEM, AND STORAGE MEDIUM OF ADR PREDICTION MODEL FOR ELDERLY PATIENTS

(71) Applicant: WEST CHINA HOSPITAL, SICHUAN UNIVERSITY, Sichuan (CN)

(72) Inventors: Ting Xu, Sichuan (CN); Qiaozhi Hu, Sichuan (CN); Zhiyao He, Sichuan (CN); Bin Wu, Sichuan (CN); Min Luo, Sichuan (CN)

(73) Assignee: WEST CHINA HOSPITAL, SICHUAN UNIVERSITY, Sichuan (CN)

( * ) Notice: Subject to any disclaimer, the term of this patent is extended or adjusted under 35 U.S.C. 154(b) by 0 days.

(21) Appl. No.: 19/018,064

(22) Filed: Jan. 13, 2025

(65) Prior Publication Data
US 2025/0232858 A1  Jul. 17, 2025

(30) Foreign Application Priority Data
Jan. 12, 2024  (CN) .......................... 202410049577.5

(51) Int. Cl.
*G16H 20/10* (2018.01)
*G06N 20/20* (2019.01)
*G16H 50/70* (2018.01)

(52) U.S. Cl.
CPC ............. *G16H 20/10* (2018.01); *G06N 20/20* (2019.01); *G16H 50/70* (2018.01)

(58) Field of Classification Search
CPC .............................. G16H 20/10; G16H 50/70
See application file for complete search history.

(56) References Cited

U.S. PATENT DOCUMENTS

2020/0078435 A1* 3/2020 Michaud .............. A61K 38/014
2021/0090694 A1* 3/2021 Colley .................. G16B 30/00
(Continued)

FOREIGN PATENT DOCUMENTS

| CN | 110322944 A | 10/2019 |
| CN | 113901207 A | 1/2022 |
| CN | 116913549 A | 10/2023 |

OTHER PUBLICATIONS

Hu, Qiaozhi et al., "Predicting adverse drug events in older inpatients, a machine learning study", International Journal of Clinical Pharmacy, Sep. 17, 2022, vol. 44, pp. 1304-1311.
(Continued)

*Primary Examiner* — Jay M. Patel
(74) *Attorney, Agent, or Firm* — NKL Law; Allen Xue

(57) ABSTRACT

Methods for constructing an ADR prediction model for elderly patients, a prediction system, and/or a storage medium are disclosed. The method includes constructing ADR trigger entries for elderly patients; based on the ADR trigger entries for elderly patients, combining evidence-based evaluation results to construct a dataset of risk factors related to ADRs in elderly patients; completing the annotation of risk factors and ADR discrimination for the dataset related to ADRs in elderly patients; using the annotated dataset information to train a machine learning model, so as to obtain an ADR risk prediction model for elderly patients. A prediction system utilizing the ADR prediction model for elderly patients is constructed.

7 Claims, 2 Drawing Sheets

(56) References Cited

U.S. PATENT DOCUMENTS

2021/0210170 A1* 7/2021 Gardner ................ G16H 70/40
2022/0336111 A1* 10/2022 Ohana ..................... G06N 3/09

OTHER PUBLICATIONS

Li, Shaoqiang et al., "Applicability of global trigger tool method for clinical application in early warning of adverse drug events in adult and senile patients", Evaluation and analysis of drug-use in hospitals in China, Nov. 30, 2023, vol. 23, No. 11, pp. 1381-1386.

\* cited by examiner

CONSTRUCTION METHOD, PREDICTION SYSTEM, AND STORAGE MEDIUM OF ADR PREDICTION MODEL FOR ELDERLY PATIENTS

FIELD OF THE INVENTION

The present invention belongs to the field of predicting adverse drug reactions, and specifically relates to a method for constructing an ADR prediction model for elderly patients, a prediction system, and a storage medium.

BACKGROUND OF THE INVENTION

Adverse drug reactions (ADRs) refer to harmful reactions that occur under normal usage and dosage of qualified drugs, which are unrelated to the intended purpose of medication. Minimizing and avoiding ADRs during medication administration is of great significance for patients.

In 2003, the Institute for Healthcare Improvement (IHI) introduced the Global Trigger Tool (GTT) for monitoring medical-related adverse events (AEs), including ADRs. This tool incorporates triggers based on case review, and by monitoring clues related to medical AEs, it purposefully locates content related to AEs, thereby enhancing the efficiency and accuracy of case review.

Since its introduction, GTT has undergone nearly 20 years of research and application by scholars both domestically and internationally, achieving significant progress. Currently, GTT can only be used for active monitoring of ADRs with low efficiency, and it cannot be used for predicting ADRs, thus failing to effectively prevent ADRs and reduce their incidence. Therefore, there is an urgent need in this field for a method that can predict ADRs through tools such as artificial intelligence algorithms. However, the existing GTT was not designed specifically for machine learning technology. For the prediction of ADRs in specific populations (such as elderly patients), how to construct features and select appropriate model algorithms remains an urgent problem to be solved in this field.

CONTENT OF THE INVENTION

Addressing the issues in the prior art, the present invention introduces a method for constructing a prediction model and a prediction system for adverse drug reactions in elderly patients. The aim is to facilitate the prediction of adverse drug reactions in elderly patients and aid clinical medication decisions.

A method for constructing an ADR prediction model for elderly patients, which comprises the following steps:

Step 1: Constructing an ADR trigger entries for elderly patients, which includes laboratory results, rescue medication use, symptoms, and blood drug concentration;

Step 2: Based on the ADR trigger entries for elderly patients, selecting risk factors and constructing a dataset of ADR risk factors related to the triggers for elderly patients;

Step 3: Completing the risk factor annotation and ADR discrimination for the dataset of ADR risk factors in elderly patients related to triggers;

Step 4: Training a machine learning model using the dataset information annotated in Step 3 to obtain an ADR risk prediction model for elderly patients;

The risk factors include at least one of the patient's basic information, disease conditions, symptoms and signs, laboratory examination results, or medication situation.

Preferably, the basic information of the patient includes at least one of the following characteristics: gender, age, height, weight, surgical history, infectious disease history, allergy history, smoking history, admission method, and admission condition;

The disease conditions include at least one of the following features: main diagnostic classification, number of admission diagnoses, department of admission, level of nursing care upon admission, number of hospitalizations before admission, whether surgery was performed, and type of surgery; the main diagnostic classification includes whether the patient has a disease, and the diseases include at least one of the following types: infectious diseases or parasitic diseases, tumor diseases, blood or hematopoietic organ diseases, immune system diseases, endocrine or metabolic diseases, neurological or psychiatric diseases, eye or ear diseases, circulatory system diseases, respiratory system diseases, digestive system diseases, skin diseases, musculoskeletal or connective tissue diseases, urogenital system diseases, injuries or poisoning;

The symptoms and signs include at least one of the following features: admission temperature, breathing, pulse, heart rate, blood pressure, and mental status;

The laboratory examination includes at least one of the following features: alanine aminotransferase, aspartate aminotransferase, alkaline phosphatase, total bilirubin, creatinine, creatinine clearance rate, white blood cell count and percentage, red blood cell count, hemoglobin, platelet count, lymphocyte count, eosinophil count, neutrophil count, international normalized ratio, D-dimer, blood glucose, and glycosylated hemoglobin;

The medication situation includes the number of medication types, medication frequency, and drug categories. The drug categories include at least one of the following types: penicillin antibiotics, cephalosporin antibiotics, β-lactamase inhibitors and their compound formulations with β-lactam antibiotics, carbapenems and other β-lactam antibiotics, aminoglycoside antibiotics, tetracycline antibiotics, macrolide antibiotics, lincomycin antibiotics, glycopeptide antibiotics, other antibacterial antibiotics, sulfonamide antibiotics, trimethoprim antibacterial drugs, nitrofuran antibacterial drugs, quinolone antibacterial drugs, nitroimidazole antibacterial drugs, oxazolidinone antibacterial drugs, bactericidal drugs for *Mycobacterium tuberculosis*, bacteriostatic drugs for *Mycobacterium tuberculosis*, polyene antifungal drugs, azole antifungal drugs, allylamine antifungal drugs, echinocandin antifungal drugs, pyrimidine antifungal drugs, broad-spectrum antiviral drugs, antiretroviral drugs, anti-herpes virus drugs, anti-influenza virus drugs, anti-hepatitis virus drugs, drugs for controlling malaria symptoms, drugs for preventing the spread and prevention of malaria, anti-amoebic drugs, anti-*trichomonas* drugs, anti-leishmaniasis drugs, other antiprotozoal drugs, anti-schistosomiasis drugs, drugs against other trematodes, anti-filarial drugs, anthelmintics, broad-spectrum anthelmintics and insecticides, anlitapeworm, other anthelmintics, resuscitative central nervous system stimulants, psychostimulant central nervous system stimulants, central nervous system stimulants promoting brain metabolism, opioid analgesics, non-opioid analgesics, formic acid antipyretic-analgesic and anti-inflammatory drugs, acetic acid antipyretic-analgesic and anti-inflammatory drugs, propionic acid antipyretic-analgesic and anti-inflammatory drugs, fenamic acid antipyretic-analgesic and anti-inflammatory drugs, pyrazolone antipyretic-analgesic and anti-inflammatory drugs, aniline-based antipyretic-analgesic, and anti-inflammatory drugs, sulfonylanilide antipyretic-analgesic and anti-inflammatory drugs, oxicam antipyretic-analgesic and anti-inflammatory drugs, coxib antipyretic-analgesic and anti-inflammatory drugs, other antipyretic-analgesic and anti-inflammatory drugs, anti-gout drugs inhibiting granulocyte infiltration, anti-gout drugs promoting uric acid excretion, anti-gout drugs inhibiting uric acid production, anti-epileptic drugs regulating sodium channels, anti-epileptic drugs regulating γ-aminobutyric acid, anti-epileptic drugs for absence seizures, other anti-epileptic drugs, benzodiazepine sedative hypnotics and anticonvulsants, barbiturate sedative hypnotics and anticonvulsants, aldehyde sedative hypnotics and anticonvulsants, cyclopyrrolidone sedative hypnotics and anticonvulsants, other sedative hypnotics and anticonvulsants, DA precursor antiparkinsonian drugs, peripheral dopamine decarboxylase inhibitor antiparkinsonian drugs, catechol-O-methyltransferase inhibitor antiparkinsonian drugs, central DA receptor agonist antiparkinsonian drugs, anticholinergic antiparkinsonian drugs, monoamine oxidase-B inhibitor antiparkinsonian drugs, other antiparkinsonian drugs, phenothiazine antipsychotics, butyrophenone antipsychotics, thioxanthene antipsychotics, benzamide antipsychotics, novel structural antipsychotics, long-acting antipsychotics, benzodiazepine anxiolytics, non-benzodiazepine anxiolytics, lithium salt antimanic drugs, other antimanic drugs, tricyclic antidepressants, monoamine oxidase inhibitor antidepressants, selective 5-hydroxytryptamine reuptake inhibitor antidepressants, selective norepinephrine reuptake inhibitor antidepressants, selective 5-hydroxytryptamine and norepinephrine reuptake inhibitor antidepressants, norepinephrine and specific serotoninergic antidepressants, selective serotonin reuptake activator antidepressants, central nervous system stimulant antidepressants, other types of antidepressants, thrombolytic cerebrovascular drugs, anti-platelet aggregation cerebrovascular drugs, free radical scavenging cerebrovascular drugs, calcium antagonist cerebrovascular drugs, vasodilator cerebrovascular drugs acting directly on vascular smooth muscle, cerebrovascular drugs improving microcirculation and reducing blood viscosity, cerebrovascular drugs improving brain metabolism, other types of cerebrovascular drugs, cholinesterase inhibitor anti-senile dementia and brain metabolism improvement agents, NMDA receptor antagonist anti-senile dementia and brain metabolism improvement agents, pyrrolidone brain metabolism activators, agents enhancing brain oxygen or glucose or energy metabolism for anti-senile dementia and brain metabolism improvement, other types of anti-senile dementia and brain metabolism improvement agents, inhalational general anesthetics, intravenous general anesthetics, ester local anesthetics, amide local anesthetics, other types of local anesthetics, skeletal muscle relaxants, direct-acting cholinomimetic agents, anti-cholinesterase cholinomimetic agents, muscarinic receptor antagonist anticholinergic agents, nicotinic receptor antagonist anticholinergic agents, adrenergic drugs, αβ-receptor antagonists, α-receptor antagonists, β-receptor antagonists, selective calcium channel blockers, non-selective calcium channel blockers, cardiac glycosides, non-glycoside positive inotropic agents, enkephalin inhibitors, sodium channel blocker antiarrhythmic agents, β-receptor blockers, action potential prolongation antiarrhythmic agents, calcium channel blockers, nitrate anti-anginal agents, nitrite anti-anginal agents, other anti-anginal agents, calcium channel blocker peripheral vasodilator, peripheral vasodilators by directly dilating small vascular smooth muscles, renin inhibitor antihypertensive agents, ACEI antihypertensive agents, ARB antihypertensive agents, diuretics antihypertensive agents, calcium channel blocker antihypertensive agents, peripheral vasodilator antihypertensive agents, calcium channel opener antihypertensive agents, central antihypertensive agents, adrenergic receptor antagonist antihypertensive agents, antihypertensive agents affecting sympathetic neurotransmitters, ganglionic blocker antihypertensive agents, adrenergic anti-shock vasoactive agents, other anti-shock vasoactive agents, agents affecting cholesterol synthesis, agents affecting cholesterol absorption and transport, agents affecting lipoprotein transport and decomposition, antioxidant lipid-regulating agents, polyunsaturated fatty acid lipid-regulating agents, nauseating expectorants and irritating expectorants, mucolytic agents, mucus diluents, central cough suppressants, peripheral cough suppressants, β-adrenergic receptor agonist bronchodilators, M-cholinergic receptor antagonist bronchodilators, xanthine bronchodilators, histamine release inhibitor bronchodilators, adrenocortical hormone bronchodilators, anti-leukotriene bronchodilators, antacids, H2 receptor antagonist gastric acid secretion inhibitors, proton pump inhibitor gastric acid secretion inhibitors, selective anticholinergic gastric acid secretion inhibitors, gastrin receptor antagonist gastric acid secretion inhibitors, colloidal bismuth gastric mucosal protectants, prostaglandins and their derivatives gastric mucosal protectants, other agents for treating peptic ulcers, agents for eradicating *Helicobacter pylori*, gastrointestinal motility drugs, M-receptor antagonist gastrointestinal spasmolytics, other types of gastrointestinal spasmolytics, digestants, gastro-kinetic agents, thiazide antiemetic agents, antihistamine antiemetic agents, dopamine or 5-hydroxytryptamine receptor antiemetic agents, other types of antiemetic agents, emetics, bulking laxatives, irritant laxatives, lubricating laxatives, softening laxatives, antidiarrheal agents, probiotics, prebiotics, synbiotics, cell regeneration-promoting agents, transaminase-lowering and hepatoprotective agents, choleretic and hepatoprotective agents, basic metabolic agents for hepatic and cholalic diseases, detoxification and hepatoprotective agents, anti-inflammatory and hepatoprotective agents, antiviral agents for hepatic and cholalic diseases, 5-aminosalicylic acids for inflammatory bowel diseases, other agents for inflammatory bowel diseases, other digestive system drugs, agents for promoting blood coagulation system function, coagulation factor preparations, agents for inhibiting fibrinolytic system, hemostatic agents acting on blood vessels, agents for promoting thrombocytopoiesis, other coagulants, heparin anticoagulants, vitamin K antagonist anticoagulants, citrate anticoagulants, fibrinolytic agents, direct factor IIa inhibitors, direct factor Xa inhibitors, anti-platelet agents, other anticoagulants, plasma and plasma substitutes, iron anti-anemia agents, folic acid anti-anemia agents, other anti-anemia agents, traditional leukocyte growth-promoting agents, biological products for leukocyte growth promotion, plant extracts for leukocyte growth promotion, antiplatelet agents, loop diuretics, thiazine diuretics, potassium-sparing diuretics and carbonic anhydrase inhibitors, acidic salt diuretics, xanthine compound diuretics, agents for the treatment of diabetes insipidus, a receptor antagonists for the treatment of benign prostatic hyperplasia, 5α reductase inhibitors for the treatment of benign prostatic hyperplasia, androgen receptor antagonist drugs for the treatment of benign prostatic hyperplasia, posterior pituitary uterotonic agents, ergot uterotonic agents, prostaglandin uterotonic agents, agents promoting cervical ripening, anti-preterm labor agents, dopamine receptor agonist lactation-reducing agents, estrogen lactation-reducing agents, pituitary hormones and related agents, glucocorticoid agents, mineralocorticoid agents, weak androgenic agents, androgenic and anabolic agents, estrogenic agents, progestogenic agents, estrogen receptor modulators, gonadotropin agents, short-acting oral contraceptives, long-acting contraceptives, external contraceptives, male contraceptives, glucagon, ultra-short-acting insulin, short-acting insulin, medium-acting insulin, long-acting insulin, ultra-long-acting insulin, premixed insulin, sulfonylurea hypoglycemic agents, insulin secretagogue hypoglycemic agents, α-glucosidase inhibitor hypoglycemic agents, biguanide hypoglycemic agents, thiazolidinedione hypoglycemic agents, DDP-4 inhibitor hypoglycemic agents, SGLT-2 inhibitor hypoglycemic agents, GLP-1 inhibitor hypoglycemic agents, anti-obesity agents, thyroid hormone agents, anti-thyroid agents, bone resorption inhibitors, bone formation promoters, drugs for hyperosteogeny, antihistamines, agents for blocking histamine release, other anti-allergic agents, calcineurin inhibitors, antiproliferative agents, polyclonal or monoclonal antibody immunosuppressants, traditional Chinese medicine immunosuppressants, immune enhancers, alkylating agents, anti-metabolic anti-tumor agents, anti-tumor antibiotics, plant-derived anti-tumor agents and their derivatives, anti-tumor hormone agents, anti-tumor targeted drugs, other anti-tumor agents and adjuvant therapy agents, vitamin A or vitamin D agents, vitamin B agents, vitamin C and other vitamins, enzyme agents, other biochemical preparations, electrolyte balance regulators, acid-base balance regulators, other agents for regulating water or electrolyte or acid-base balance, compound electrolyte infusion and dialysis solution, general enteral nutrition agents, disease-specific enteral nutrition agents, amino acid parenteral nutrition agents, fat emulsion parenteral nutrition agents, other types of parenteral nutrition agents, agents for the treatment of glaucoma, agents for the treatment of dry eye, vascular endothelial growth factor inhibitor ophthalmic agents, agents for the treatment of cataract, other ophthalmic agents, otorhinolaryngological and dental agents, anti-infective dermatological agents, disinfectant and antiseptic dermatological agents, skin cleansers, corticosteroid dermatological agents, disinfectant and antiseptic astringents, detoxification agents for metal poisoning, detoxification agents for organophosphate poisoning, detoxification agents for cyanide poisoning, detoxification agents for organic fluorine poisoning, detoxification agents for benzodiazepine poisoning, detoxification agents for morphine poisoning, detoxification agents for acetaminophen poisoning and other detoxification agents, agents for the prevention and treatment of radiation sickness, tract contrast media and intravascular drug delivery enhancement contrast media, gastrointestinal contrast media, bronchial contrast media, lymph contrast media, MRI contrast media, ultrasound contrast media, organ function examination and other diagnostic agents, biological products for prevention, biological products for treatment, in vivo diagnostic reagents, formula for relieving superficies syndrome with pungent and warm natured drugs in internal medicine, formula for relieving superficies syndrome with pungent and cool natured drugs in internal medicine, formula for relieving both superficial and internal disorders in internal medicine, formula for strengthening body resistance and relieving superficies in internal medicine, formula for dispelling summer heat to relieve exterior syndrome in internal medicine, formula for clearing summer-heat and removing damp in internal medicine, formula for strengthening stomach and relieving summer heat in internal medicine, formula for clearing fire and promoting bowel movements in internal medicine, formula with purgative action in internal medicine, formula for eliminating fullness and promoting bowel movements in internal medicine, formula for heat-clearing and purging pathogenic fire in internal medicine, formula for clearing heat and detoxicating in internal medicine, formula for clearing heat in viscerae in internal medicine, formula for clearing heat and sedating in internal medicine, formula for warming interior to disperse cold in internal medicine, formula for warming interior to eliminate dampness in internal medicine, formula for restoring yang and rescuing patient from collapse in internal medicine, formula for dissolving cold phlegm with warmth in internal medicine, formula for astringing lung to relieve cough in internal medicine, formula for clearing heat and resolving phlegm in internal medicine, formula for moistening lung to remove phlegm in internal medicine, anti-asthmatic agents for internal medicine, formula for eliminating stagnation and resolving phlegm in internal medicine, formula for clearing heat and resuscitation in internal medicine, formula for aromatic or phlegm-reducing resuscitation in internal medicine, formula for astringing spermatorrhea in internal medicine, formula for arresting discharges and antidiarrheal in internal medicine, formula for tonifying kidney to reduce urination in internal medicine, formula for supplementing qi in internal medicine, formula for nourishing blood in internal medicine, formula for nourishing yin in internal medicine, formula for warming yang in internal medicine, formula for benefiting both yin and yang in internal medicine, formula for benefiting both qi and blood in internal medicine, formula for boosting qi and nourishing yin in internal medicine, formula for boosting qi and restoring pulse in internal medicine, formula for tranquilizing by nourishing the heart in internal medicine, formula for boosting qi and nourishing blood for tranquillization in internal medicine, formula for removing heat from the liver for tranquillization in internal medicine, formula for tonifying kidney for tranquillization in internal medicine, formula for tranquilization with heavy material in internal medicine, hemostatic agents for internal medicine, formula for benefiting qi and activating blood circulation in internal medicine, formula for activating qi flowing and activating blood circulation in internal medicine, formula for nourishing blood and activating blood circulation in internal medicine, formula for warming yang and promoting blood circulation in internal medicine, formula for nourishing yin and activating blood circulation in internal medicine, formula for nourishing kidney and activating blood circulation in internal medicine, formula for resolving phlegm and relaxing chest in internal medicine, formula for removing blood stasis and promoting qi circulation in internal medicine, formula for invigorating blood circulation and eliminating symptoms in internal medicine, formula for clearing stasis and sputum in internal medicine, formula for dispersing stagnated liver qi and relieving qi stagnation in internal medicine, formula for soothing liver and regulating stomach in internal medicine, formula for resolving food stagnancy in internal medicine, formula for dispersing external wind in internal medicine, formula for calming liver to stop endogenous wind in internal medicine, formula for suppressing hyperactive liver and subsiding yang in internal medicine, formula for eliminating phlegm and calming wind in internal medicine, formula for removing blood stasis and dispelling wind in internal medicine, formula for nourishing blood to expel wind in internal medicine, formula for dispelling wind and removing obstruction in the meridians in internal medicine, formula for dispelling cold and removing dampness in internal medicine, formula for dispelling wind and dampness in internal medicine, formula for removing blood stasis and dispelling dampness in internal medicine, formula for inducing diuresis to remove edema in internal medicine, formula for clearing heat and freeing strangury in internal medicine, formula for removing blood stasis and freeing strangury in internal medicine, formula for tonifying the body's righteousness and eliminating dampness in internal medicine, formula for resolving turbidity and lowering lipid in internal medicine, formula for purging liver and gallbladder in surgical medicine, formula for clearing heat and removing toxicity in surgical medicine, formula for clearing heat and eliminating dampness in surgical medicine, formula for freeing strangury and dispersing stone in surgical medicine, formula for warming meridians, regulating qi, promoting blood circulation, and dispersing lumps in surgical medicine, anti-tumor Chinese patent drugs, adjuvant Chinese patent drugs for tumor, formula for regulating qi and nourishing blood in gynecological medicine, formula for activating blood and removing stasis in gynecological medicine, gynecological hemostatic agent, oral formula for clearing away heat in gynecological medicine, external formula for clearing away heat in gynecological medicine, formula for tonifying the body's righteousness in gynecological medicine, formula for dissipating detumescence and lump in gynecological medicine, formula for clearing away heat in ophthalmological medicine, formula for tonifying the body's righteousness in ophthalmological medicine, formula for removing blood stasis in ophthalmological medicine, formula for clearing away heat in ophthalmological medicine, formula for activating blood and removing stasis in orthopedic medicine, formula for promoting blood circulation to remove obstruction in collaterals in orthopedic medicine, formula for tonifying kidney and strengthening bone in orthopedic medicine, Tibetan medicine, Mongolian medicine, and Uyghur medicine.

Preferably, in step 3, during the annotation process, the identification of ADRs is carried out based on the judgment criteria established by the National Center for ADR Monitoring, China.

Preferably, in step 4, before using the annotated dataset to train the machine learning model, data preprocessing is also performed. The data preprocessing includes: deleting features with missing values greater than 20%, and using at least one method for handling missing values; the methods for handling missing values include: at least one of no imputation, mean imputation, regression imputation, or missForest method.

Preferably, the algorithm of the machine learning model is selected from XGBoost, AdaBoost, CatBoost, GBDT, LightGBM, TPOT, or random forest.

Preferably, the risk factors include: age, number of admission diagnoses, number of hospitalizations before admission, tumor disease, level of nursing care upon admission, gender, number of drug types, frequency of medication administration, and drug category;
  the algorithm of the machine learning model is selected from the boosting ensemble learning models.

Preferably, the risk factors include: age, number of admission diagnoses, number of hospitalizations before admission, tumor disease, level of nursing care upon admission, and gender;
  the algorithm of the machine learning model is selected from Random Forest.

The present invention also provides an ADR prediction system for elderly patients, which comprises:
  the data acquisition and storage module, used for acquiring and storing ADR data of elderly patients;
  the prediction module, integrating an ADR prediction model for elderly patients, obtained by the above method for constructing an ADR prediction model for elderly patients, which is used to calculate the ADR-related characteristic data of the elderly patients, thereby obtaining the prediction results of ADR occurrence in elderly patients;
  the result output module, used to output the real-time prediction results from the prediction module, facilitating auxiliary decision-making for medication plans.

The present invention also provides a computer-readable storage medium, which stores a computer program for implementing the above method for constructing an ADR prediction model for elderly patients, or for implementing the above ADR prediction system for elderly patients.

In the present invention, "risk factor annotation" refers to annotating the nature of different characteristics (i.e., risk factors) for each patient among all features, such as whether a certain type of medicament is used, whether there is a certain disease, whether there are certain symptoms or signs, etc., for subsequent machine learning. "ADR discrimination" refers to manually discriminating whether an ADR has occurred, for subsequent machine learning.

The present invention aims to predict ADRs in elderly patients, optimize ADR trigger entries, and select corresponding features based on these entries to establish a machine learning model, achieving artificial intelligence prediction of ADRs in elderly patients. The prediction model and system established in the present invention exhibit excellent predictive performance, enabling the assessment and prediction of ADR risks for existing or alternative medication regimens in elderly patients, thereby assisting clinical decision-making. Therefore, the present invention holds great potential for clinical application.

Obviously, based on the above content of the present invention, according to the common technical knowledge and the conventional means in the field, other various modifications, alternations, or changes can further be made, without department from the above basic technical spirits.

With reference to the following specific examples, the above content of the present invention is further illustrated. But it should not be construed that the scope of the above subject matter of the present invention is limited to the following examples. The techniques realized based on the above content of the present invention are all within the scope of the present invention.

EXAMPLES

Figure 1:
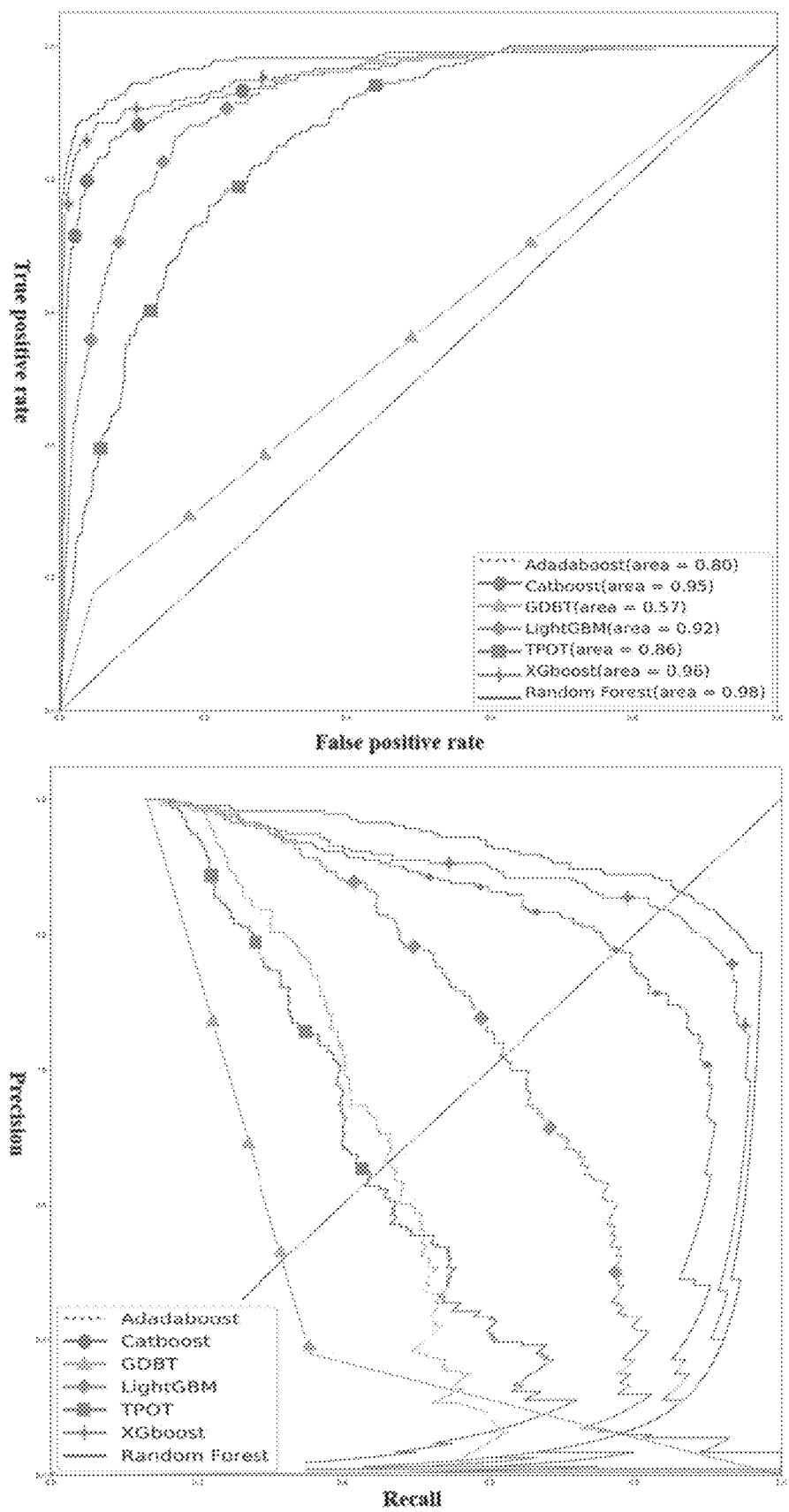
FIG. 1. The visualization results of different machine learning models in Example 1; wherein, (A) is the Receiver Operating Characteristic (ROC) curve, and (B) is the precision-recall curve, with "AUC" representing the area under the ROC curve.

It should be noted that the algorithms for data collection, transmission, storage, and processing steps not specifically described in the examples, as well as the hardware structure and circuit connections not specifically described, can be performed by the published content available in the prior art.

Example 1

The purpose of this example was to construct an ADR prediction model for elderly patients, thereby realizing artificial intelligence-based ADR prediction for elderly patients. The specific steps were as follows:

S1, based on the original global trigger tool (GTT), a final version of trigger entries for adverse drug reactions in elderly patients was developed.

S11, an evidence-based evaluation approach was specifically adopted, and literature retrieval had yielded global trigger tool literature reports for monitoring adverse drug events in adult (or elderly) inpatients, including the original global trigger tool (GTT). The trigger entries from the studies were summarized and incorporated to form the initial draft for the Delphi expert consultation;

S12, the experts to participate in the Delphi expert consultation were selected, and the selection criteria included: 1) Clinical medical experts: selecting clinicians who had been engaged in specialized medical work for more than 10 years, based on common diseases among elderly inpatients and their departments; 2) Clinical nursing experts: selecting clinical nurses who had been engaged in nursing work for more than 10 years; 3) Clinical pharmacists: selecting clinical pharmacists who had been engaged in pharmaceutical work for more than 10 years and were familiar with the rational use of drugs and drug safety monitoring.

S13, communicating with experts via telephone and email, and conducting two rounds of questionnaire surveys. Experts were invited to rate the suitability of triggers in the observation of adverse drug events in elderly hospitalized patients using a 10-point scale, where 10 points indicated very suitable and 0 points indicated very unsuitable. Additionally, experts were also invited to rate their familiarity with triggers and the basis for their judgments.

S14, after the first round of investigation, expert ratings were collected, and triggers were deleted based on the rating results. Meanwhile, in this study, the modification suggestions proposed by experts were also fully considered, and triggers were modified or added accordingly; for the second round, based on the results of the first round, another round of rating was conducted to determine the final results.

S15, the selection of triggers was carried out by using the threshold method to screen evaluation indicators, and based on the suitability score of each indicator, the full-score frequency, arithmetic mean, and coefficient of variation were calculated. The threshold calculation method for the full-score frequency and arithmetic mean is: the threshold=mean−standard deviation, and the indicators with scores higher than the threshold were selected; the threshold calculation method for the coefficient of variation is: the threshold=mean+standard deviation, and the indicators with scores lower than the threshold were selected. To avoid important indicators being eliminated, only indicators that failed to meet the requirements in all three measurement scales were eliminated. For indicators that failed to meet the requirements in one or two measurement scales, the research team made decisions after discussion based on principles such as directionality, scientificity, and availability.

S16, based on the results of the Delphi expert consultation, a preliminary version of the ADR trigger list for elderly patients, containing 42 triggers, was ultimately obtained. Details are provided in Table 1.

TABLE 1

ADR trigger entries for elderly patients (preliminary version).

| No. | Triggers | Annotation |
|---|---|---|
| | Laboratory results | |
| 1 | The time for activating partial thromboplastin exceeds 100 s. | Related to anticoagulant drugs, identified as an ADE, accompanied by symptoms related to bleeding. |
| 2 | International normalized ratio (INR) exceeds 5. | The same as above. |
| 3 | Blood glucose is lower than 2.8 mmol/L. | Identified as ADE, accompanied by symptoms related to hypoglycemia. |
| 4 | Urea nitrogen or creatinine levels are more than twice the baseline. | Drug-induced renal dysfunction. |

TABLE 1-continued

ADR trigger entries for elderly patients (preliminary version).

| No. | Triggers | Annotation |
|---|---|---|
| 5 | ALT (or AST) ≥3 ULN and/or ALP ≥2 ULN, T-BIL >2.5 ULN, which may be accompanied by abnormal INR. | Drug-induced liver dysfunction. |
| 6 | Blood platelet <75 × 109/L | Drug-induced thrombocytopenia. |
| 7 | White blood cell <3.0 × 109/L | Drug-induced leukopenia. |
| 8 | Hemoglobin, male >175 g/L; female >150 g/L | The use of EPO in CKD patients can lead to an increase in hemoglobin. |
| 9 | Hemoglobin decreases by more than 25%. | Drug-related anemia or bleeding. |
| 10 | Blood potassium <3.5 mmol/L | Drug-related hypokalemia. |
| 11 | Blood potassium >5.5 mmol/L | Drug-related hyperkalemia. |
| 12 | Blood calcium >2.62 mmol/L | Drug-induced hypercalcemia. |
| 13 | Thyroid-stimulating hormone <0.27 mU/L (or thyroid hormone >22.40 pmol/L). | Use of drugs that may cause hyperthyroidism. |
| 14 | Thyroid-stimulating hormone >4.2 mU/L (or thyroid hormone <12.0 pmol/L). | Use of drugs that may cause hypothyroidism. |
| 15 | Positive Clostridium difficile. | Dysbiosis caused by antibiotics. |
| Plasma concentration ||| 
| 16 | Digoxin blood concentration >2 ng/ml. | Excessive use of digoxin. |
| 17 | Peak plasma concentration of gentamicin or tobramycin >10 mg/L or trough concentration >2 mg/L. | Excessive use of gentamicin or tobramycin. |
| 18 | Peak plasma concentration of cyclosporine >300 ng/ml. | Excessive use of cyclosporine. |
| 19 | Theophylline >20 mg/L | Excessive use of theophylline. |
| 20 | Tacrolimus blood concentration >20 ng/ml | Excessive use of tacrolimus. |
| 21 | Voriconazole blood concentration >5.5 mg/L, Blurred vision, hallucinations. | Excessive use of Voriconazole. |
| Administration of rescue drugs ||| 
| 22 | Administration of vitamin K | Counteracting bleeding caused by anticoagulant drugs. |
| 23 | Administration of anti-allergic drugs (such as loratadine, diphenhydramine, cetirizine, glucocorticoids, calcium gluconate injection, etc.). | Combating drug-induced allergies; the type of medication can be determined based on the specific situation of our hospital. |
| 24 | Administration of flumazenil. | Counteracting benzodiazepine poisoning. |
| 25 | Administration of naloxone. | Counteracting opioid poisoning (excluding cases of opioid abuse). |
| 26 | Administration of antiemetic drugs (ondansetron, granisetron, metoclopramide, aprepitant, etc.). | Combating drug-induced vomiting. |
| 27 | Administration of antidiarrheal drugs, intestinal flora microbial preparations, or oral vancomycin and metronidazole, etc. | Treating diarrhea caused by antibiotic-resistant bacteria, as well as drugs for treatment of constipation or gastric motility drugs. |
| 28 | Administration of drugs for treating constipation (such as glycerine enema, polyethylene glycol, lactulose, etc.). | Addressing drug-induced constipation. |
| 29 | Administration of 50% glucose. | To combat hypoglycemia symptoms, it is necessary to have hypoglycemia symptoms as a condition for identifying an ADE. |
| 30 | Administration of protamine. | Counteracting heparin-induced bleeding. |
| 31 | Administration of adrenaline. | Rescue of anaphylactic shock caused by medication. |
| 32 | Intravenous infusion of glucose injection + regular insulin. | Drug-induced hyperkalemia. |
| 33 | Blood transfusion. | Combating drug(chemotherapy)-related anemia or (anticoagulants) bleeding. |
| 34 | Temporary intravenous or subcutaneous insulin for non-diabetics. | Drug-induced hyperglycemia. |
| Symptoms ||| 
| 35 | Excessive sedation or hypotension or falls (determined based on the patient's condition on the day and physical examination results recorded in the patient's medical history). | Sedation caused by medication and other related conditions. |

TABLE 1-continued

ADR trigger entries for elderly patients (preliminary version).

| No. | Triggers | Annotation |
|---|---|---|
| 36 | Rash | Drug-related rash. |
| 37 | Dehydration | Related to the use of diuretics. |
| 38 | Insane | Drug-induced mental disorders. |
| 39 | Bradycardia <60 beats/min | Bradycardia caused by drugs. |
| 40 | Respiratory rate <12 breaths/min | Respiratory depression caused by opioids such as morphine. |
| | Disposal measures | |
| 41 | Sudden cessation of medication (which can be indicated in medical advice, as normal drug withdrawal is not considered sudden). | Sudden drug withdrawal due to ADE. |
| | Other | |
| 42 | Other rare adverse events (such as interstitial pneumonia, fever, psychiatric disorders, etc.). | Other ADEs identified during the review of medical records. |

S17, the elderly patients in the research medical institution of the Example (West China Hospital of Sichuan University) were selected as the research subjects. Information was collected from the electronic medical record system, including personal details, disease information, and medication data.

A certain number of cases were randomly selected, and the aforementioned ADR trigger entries for elderly patients (preliminary version) were used to conduct research on real cases. Based on the ADR monitoring results of these real cases, a total of 28 ADR trigger entries (final version) were obtained. Details are shown in Table 2.

TABLE 2

ADR trigger entries for elderly patients (final version).

| No | Trigger | No | Trigger |
|---|---|---|---|
| | Laboratory results | 15 | Blood transfusion |
| 1 | The time for activating partial thromboplastin exceeds 100 s. | | Symptoms |
| 2 | International normalized ratio (INR) exceeds 5. | 16 | Excessive sedation or hypotension or falls |
| 3 | Blood glucose is lower than 2.8 mmol/L | 17 | Rash |
| 4 | Urea nitrogen or creatinine levels have increased by more than 2 times compared to those upon admission. | 18 | Bradycardia <60 beats/min |
| 5 | ALT (or AST) ≥3 ULN and/or ALP ≥2 ULN, T-BIL >2.5 ULN (ULN: the highest value) | | Plasma concentration |
| 6 | Blood platelet <75 × 10^9/L | 19 | The plasma concentration of vancomycin is higher than the upper limit of normal range. |
| 7 | White blood cell <3.0 × 10^9/L | 20 | The plasma concentration of phenytoin is higher than the upper limit of normal range. |
| 8 | Hemoglobin decreased by more than 25% compared to admission. | 21 | The plasma concentration of valproic acid is higher than the upper limit of normal range. |
| 9 | Blood potassium <3.5 mmol/L | 22 | The plasma concentration of phenobarbital is higher than the upper limit of normal range. |
| 110 | Blood potassium >5.5 mmol/L | 23 | The plasma concentration of carbamazepine is higher than the upper limit of normal range. |
| | Administration of rescue drugs | 24 | The plasma concentration of vancomycin is higher than the upper limit of normal range. |
| 111 | Administration of anti-allergic drugs | 25 | The plasma concentration of lithium carbonate is higher than the upper limit of normal range |
| 112 | Administration of antiemetic drugs | 26 | The plasma concentration of tacrolimus capsules is higher than the upper limit of normal range. |
| 113 | Administration of antidiarrheal drugs or intestinal flora microbial preparations. | 27 | The plasma concentration of voriconazole is higher than the upper limit of normal range. |

TABLE 2-continued

ADR trigger entries for elderly patients (final version).

| No | Trigger | No | Trigger |
|---|---|---|---|
| 114 | Administration of drugs for treatment of constipation | 28 | The plasma concentration of mycophenolic acid is higher than the upper limit of normal range. |

S2, based on the aforementioned R trigger entries (final version or elderly patients in line with the medical institution (West China Hospital of Sichuan University), combined with evidence-based evidence and drug instructions, a dataset of ADR risk factors for elderly patients was constructed.

Specifically, based on the ADR types involved in the ADR trigger entries (final version), we retrieved literature related to a specific ADR, information from domestic and international ADR monitoring databases, as well as ADR information from existing hospital drug instructions. We established a dataset of ADR risk factors for elderly patients. The features in the dataset include non-drug factors (including patient's basic information, disease conditions, symptoms and signs, laboratory tests) and drug factors (medication use). Specifically, the features used in this example include:

1. Basic patient information: gender, age, height, weight, surgical history, infectious disease history, allergy history, smoking history, admission method, admission condition;
2. Disease conditions: main diagnostic categories (infectious diseases or parasitic diseases, tumor diseases, blood or hematopoietic organ diseases, immune system diseases, endocrine or metabolic diseases, neurological or psychiatric diseases, eye or ear diseases, circulatory system diseases, respiratory system diseases, digestive system diseases, skin diseases, musculoskeletal or connective tissue diseases, urogenital system diseases, injuries or poisoning), number of admission diagnoses, department of admission, level of nursing care upon admission, number of hospitalizations before admission, whether surgery was performed, type of surgery;
3. Symptoms and signs: admission temperature, respiration, pulse, heart rate, blood pressure, and mental status;
4. Admission laboratory tests: alanine aminotransferase, aspartate aminotransferase, alkaline phosphatase, total bilirubin, creatinine, creatinine clearance rate, white blood cell count and percentage, red blood cell count, hemoglobin, platelet count, lymphocyte count, eosinophil count, neutrophil count, international normalized ratio, D-dimer, blood glucose, and glycosylated hemoglobin;
5. Medication situation, including the number of medication types, the frequency of medication administration (referring to the total number of administrations within a certain period of time, for example, 3 times a day, which means a total of 30 administrations in 10 days), and the categories of medications, as shown in Table 3. It should be noted that for ease of understanding, Table 3 categorizes the types of medications into 4 levels. Level 1 includes Western medicine or Chinese patent drugs, Level 2 includes anti-infective drugs under Western medicine, Level 3 includes antibiotics under anti-infective drugs, and Level 4 includes penicillins under antibiotics. Patients should use this table as a standard to determine the category of the specific medications they use, and for those containing Level 4 classification, the drug category at Level 4 was used as the input feature. For medications that are not classified into Level 4, the category of Level 3 should be used as the input feature. Pharmaceutical professionals could use their professional knowledge to determine the category of medications based on this table.

TABLE 3

| Level 1 | Level 2 | Level 3 | Level 4 |
|---|---|---|---|
| Western medicines | Anti-infective agents | Antibiotics | penicillin antibiotics, cephalosporin antibiotics, β-lactamase inhibitors and their compound formulations with β-lactam antibiotics, carbapenems and other β-lactam antibiotics, aminoglycoside antibiotics, tetracycline antibiotics, macrolide antibiotics, lincomycin antibiotics, glycopeptide antibiotics |
| | | Chemically synthesized antibacterial agents | sulfonamide antibiotics, trimethoprim antibacterial drugs, nitrofuran antibacterial drugs, quinolone antibacterial drugs, nitroimidazole antibacterial drugs, oxazolidinone antibacterial drugs |
| | | Antitubercular agents | bactericidal drugs for *Mycobacterium tuberculosis*, bacteriostatic drugs for *Mycobacterium tuberculosis* |
| | | Antifungal agents | polyene antifungal drugs, azole antifungal drugs, allylamine antifungal drugs, echinocandin antifungal drugs, pyrimidine antifungal drugs |
| | | Antiviral agents | broad-spectrum antiviral drugs, antiretroviral drugs, anti-herpes virus drugs, anti-influenza virus drugs, anti-hepatitis virus drugs |
| | | Antiparasitic agent | drugs for controlling malaria symptoms, drugs for preventing the spread and prevention of malaria, anti-amoebic drugs, anti-trichomonas |

TABLE 3-continued

| Level 1 | Level 2 | Level 3 | Level 4 |
|---|---|---|---|
| | | | drugs, anti-leishmaniasis drugs, other antiprotozoal drugs, anti-schistosomiasis drugs, drugs against other trematodes, anti-filarial drugs, anthelmintics, broad-spectrum anthelmintics and insecticides, anlitapeworm, other anthelmintics |
| | Agents primarily acting on the central nervous system | Central nervous system stimulants | resuscitative central nervous system stimulants, psychostimulant central nervous system stimulants, central nervous system stimulants promoting brain metabolism |
| | | Analgesic drugs | opioid analgesics, non-opioid analgesics |
| | | Antipyretic-analgesic and anti-inflammatory drugs | formic acid antipyretic-analgesic and anti-inflammatory drugs, acetic acid antipyretic-analgesic and anti-inflammatory drugs, propionic acid antipyretic-analgesic and anti-inflammatory drugs, fenamic acid antipyretic-analgesic and anti-inflammatory drugs, pyrazolone antipyretic-analgesic and anti-inflammatory drugs, aniline-based antipyretic-analgesic, and anti-inflammatory drugs, sulfonylanilide antipyretic-analgesic and anti-inflammatory drugs, oxicam antipyretic-analgesic and anti-inflammatory drugs, coxib antipyretic-analgesic and anti-inflammatory drugs, other antipyretic-analgesic and anti-inflammatory drugs |
| | | Anti-gout agents | anti-gout drugs inhibiting granulocyte infiltration, anti-gout drugs promoting uric acid excretion, anti-gout drugs inhibiting uric acid production |
| | | Antiepileptic agents | anti-epileptic drugs regulating sodium channels, anti-epileptic drugs regulating γ-aminobutyric acid, anti-epileptic drugs for absence seizures, other anti-epileptic drugs |
| | | Sedative, hypnotic, and anticonvulsant agents | benzodiazepine sedative hypnotics and anticonvulsants, barbiturate sedative hypnotics and anticonvulsants, aldehyde sedative hypnotics and anticonvulsants, cyclopyrrolidone sedative hypnotics and anticonvulsants, other sedative hypnotics and anticonvulsants |
| | | Antiparkinsonian agents | DA precursor antiparkinsonian drugs, peripheral dopamine decarboxylase inhibitor antiparkinsonian drugs, catechol-O-methyltransferase inhibitor antiparkinsonian drugs, central DA receptor agonist antiparkinsonian drugs, anticholinergic antiparkinsonian drugs, monoamine oxidase-B inhibitor antiparkinsonian drugs, other antiparkinsonian drugs |
| | | Antipsychotic agents | phenothiazine antipsychotics, butyrophenone antipsychotics, thioxanthene antipsychotics, benzamide antipsychotics, novel structural antipsychotics, long-acting antipsychotics |
| | | Antianxiety agents | benzodiazepine anxiolytics, non-benzodiazepine anxiolytics |
| | | Antimanic agents | lithium salt antimanic drugs, other antimanic drugs |
| | | Antidepressants | tricyclic antidepressants, monoamine oxidase inhibitor antidepressants, selective 5-hydroxytryptamine reuptake inhibitor antidepressants, selective norepinephrine reuptake inhibitor antidepressants, selective 5-hydroxytryptamine and norepinephrine reuptake inhibitor antidepressants, norepinephrine and specific serotoninergic antidepressants, selective serotonin reuptake activator antidepressants, central nervous system stimulant antidepressants, other types of antidepressants |
| | | Anti-cerebrovascular agents | thrombolytic cerebrovascular drugs, anti-platelet aggregation cerebrovascular drugs, free radical scavenging cerebrovascular drugs, calcium antagonist cerebrovascular drugs, vasodilator cerebrovascular drugs acting directly on vascular smooth muscle, cerebrovascular drugs improving microcirculation and reducing blood viscosity, |

TABLE 3-continued

| Level 1 | Level 2 | Level 3 | Level 4 |
|---|---|---|---|
| | | Anti-senile dementia agents and cerebral metabolism improving agents | cerebrovascular drugs improving brain metabolism, other types of cerebrovascular drugs cholinesterase inhibitor anti-senile dementia and brain metabolism improvement agents, NMDA receptor antagonist anti-senile dementia and brain metabolism improvement agents, pyrrolidone brain metabolism activators, agents enhancing brain oxygen or glucose or energy metabolism for anti-senile dementia and brain metabolism improvement, other types of anti-senile dementia and brain metabolism improvement agents |
| | | Anesthetics and their adjuvant drugs | inhalational general anesthetics, intravenous general anesthetics, ester local anesthetics, amide local anesthetics, other types of local anesthetics, skeletal muscle relaxants |
| | Agents primarily acting on the autonomic nervous system | Cholinergic agents and anticholinergic agents | direct-acting cholinomimetic agents, anti-cholinesterase cholinomimetic agents, muscarinic receptor antagonist anticholinergic agents, nicotinic receptor antagonist anticholinergic agents |
| | | Adrenergic agents and anti-adrenergic agents | adrenergic drugs, αβ-receptor antagonists, α-receptor antagonists, β-receptor antagonists |
| | Agents primarily acting on the cardiovascular system | Calcium channel blocker | selective calcium channel blockers, non-selective calcium channel blockers |
| | | Agents for treating chronic cardiac insufficiency | cardiac glycosides, non-glycoside positive inotropic agents, enkephalin inhibitors |
| | | Antiarrhythmic agents | sodium channel blocker antiarrhythmic agents, β-receptor blockers, action potential prolongation antiarrhythmic agents, calcium channel blockers |
| | | Agents for the prevention and treatment of angina pectoris | nitrate anti-anginal agents, nitrite anti-anginal agents, other anti-anginal agents |
| | | Peripheral vasodilators | calcium channel blocker peripheral vasodilator, peripheral vasodilators by directly dilating small vascular smooth muscles |
| | | Antihypertensive agents | renin inhibitor antihypertensive agents, ACEI antihypertensive agents, ARB antihypertensive agents, diuretics antihypertensive agents, calcium channel blocker antihypertensive agents, peripheral vasodilator antihypertensive agents, calcium channel opener antihypertensive agents, central antihypertensive agents, adrenergic receptor antagonist antihypertensive agents, antihypertensive agents affecting sympathetic neurotransmitters, ganglionic blocker antihypertensive agents |
| | | Anti-shock vasoactive agents | adrenergic anti-shock vasoactive agents, other anti-shock vasoactive agents |
| | | Blood lipid regulating agents and anti-atherosclerosis agents | agents affecting cholesterol synthesis, agents affecting cholesterol absorption and transport, agents affecting lipoprotein transport and decomposition, antioxidant lipid-regulating agents, polyunsaturated fatty acid lipid-regulating agents |
| | Agents primarily acting on the respiratory system | Expectorant agents | nauseating expectorants and irritating expectorants, mucolytic agents, mucus diluents |
| | | Antitussive agents | central cough suppressants, peripheral cough suppressants |
| | | Antiasthmatic agents | β-adrenergic receptor agonist bronchodilators, M-cholinergic receptor antagonist bronchodilators, xanthine bronchodilators, histamine release inhibitor bronchodilators, adrenocortical hormone bronchodilators, anti-leukotriene bronchodilators |
| | Agents primarily acting on the digestive system | Agents for treating peptic ulcer and gastroesophageal reflux disease | antacids, H2 receptor antagonist gastric acid secretion inhibitors, proton pump inhibitor gastric acid secretion inhibitors, selective anticholinergic gastric acid secretion inhibitors, gastrin receptor antagonist gastric acid secretion inhibitors, colloidal bismuth gastric mucosal protectants, prostaglandins and their |

TABLE 3-continued

| Level 1 | Level 2 | Level 3 | Level 4 |
|---|---|---|---|
| | | | derivatives gastric mucosal protectants, other agents for treating peptic ulcers, agents for eradicating *Helicobacter pylori*, gastrointestinal motility drugs |
| | | Gastrointestinal antispasmodic agents | M-receptor antagonist gastrointestinal spasmolytics, other types of gastrointestinal spasmolytics |
| | | Digestants | digestants |
| | | Gastrointestinal prokinetic agents, antiemetic agents, and emetic agents | gastro-kinetic agents, thiazide antiemetic agents, antihistamine antiemetic agents, dopamine or 5-hydroxytryptamine receptor antiemetic agents, other types of antiemetic agents, emetics |
| | | Laxatives and antidiarrheal agents | bulking laxatives, irritant laxatives, lubricating laxatives, softening laxatives, antidiarrheal agents |
| | | Microbial ecological agents | probiotics, prebiotics, synbiotics |
| | | Adjunctive drugs for hepatobiliary diseases | cell regeneration-promoting agents, transaminase-lowering and hepatoprotective agents, choleretic and hepatoprotective agents, basic metabolic agents for hepatic and cholalic diseases, detoxification and hepatoprotective agents, anti-inflammatory and hepatoprotective agents, antiviral agents for hepatic and cholalic diseases |
| | | Agents for treating inflammatory bowel disease | 5-aminosalicylic acids for inflammatory bowel diseases, other agents for inflammatory bowel diseases |
| | | Other drugs for digestive system | Other drugs for digestive system |
| | Agents primarily acting on the blood and hematopoietic system | Procoagulant agents | agents for promoting blood coagulation system function, coagulation factor preparations, agents for inhibiting fibrinolytic system, hemostatic agents acting on blood vessels, agents for promoting thrombocytopoiesis, other coagulants |
| | | Anticoagulant agents | heparin anticoagulants, vitamin K antagonist anticoagulants, citrate anticoagulants, fibrinolytic agents, direct factor IIa inhibitors, direct factor Xa inhibitors, antiplatelet agents, other anticoagulants |
| | | Plasma and plasma substitutes | plasma and plasma substitutes |
| | | Antianemic agents | iron anti-anemia agents, folic acid anti-anemia agents, other anti-anemia agents |
| | | Leukocyte stimulating agents | traditional leukocyte growth-promoting agents, biological products for leukocyte growth promotion, plant extracts for leukocyte growth promotion |
| | | Antiplatelet agents | antiplatelet agents |
| | Agents primarily acting on the urinary and reproductive systems | Drugs for the urinary system | loop diuretics, thiazine diuretics, potassium-sparing diuretics and carbonic anhydrase inhibitors, acidic salt diuretics, xanthine compound diuretics, agents for the treatment of diabetes insipidus, α receptor antagonists for the treatment of benign prostatic hyperplasia, 5α reductase inhibitors for the treatment of benign prostatic hyperplasia, androgen receptor antagonist drugs for the treatment of benign prostatic hyperplasia |
| | | Drugs for the reproductive system | posterior pituitary uterotonic agents, ergot uterotonic agents, prostaglandin uterotonic agents, agents promoting cervical ripening, anti-preterm labor agents, dopamine receptor agonist lactation-reducing agents, estrogen lactation-reducing agents |
| | Agents primarily acting on the endocrine system | Pituitary hormones and related drugs | pituitary hormones and related agents |
| | | Adrenocortical hormones and adrenocorticotropic hormone | glucocorticoid agents, mineralocorticoid agents, weak androgenic agents |
| | | Sex hormones and gonadotropins | androgenic and anabolic agents, estrogenic agents, progestogenic agents, estrogen receptor modulators, gonadotropin agents |

TABLE 3-continued

| Level 1 | Level 2 | Level 3 | Level 4 |
|---|---|---|---|
| | | Contraceptive drugs | short-acting oral contraceptives, long-acting contraceptives, external contraceptives, male contraceptives |
| | | Insulin and other drugs that affect blood sugar | glucagon, ultra-short-acting insulin, short-acting insulin, medium-acting insulin, long-acting insulin, ultra-long-acting insulin, premixed insulin, sulfonylurea hypoglycemic agents, insulin secretagogue hypoglycemic agents, α-glucosidase inhibitor hypoglycemic agents, biguanide hypoglycemic agents, thiazolidinedione hypoglycemic agents, DDP-4 inhibitor hypoglycemic agents, SGLT-2 inhibitor hypoglycemic agents, GLP-1 inhibitor hypoglycemic agents |
| | | Anti-obesity drugs | anti-obesity drugs |
| | | Thyroid hormone drugs and antithyroid drugs | thyroid hormone agents, anti-thyroid agents |
| | | Drugs affecting bone metabolism | bone resorption inhibitors, bone formation promoters, drugs for hyperosteogeny |
| | Agents primarily affecting allergic reactions and immune function | Anti-allergic agents | antihistamines, agents for blocking histamine release, other anti-allergic agents |
| | | Immunosuppressive agents | calcineurin inhibitors, anti-proliferative agents, polyclonal or monoclonal antibody immunosuppressants, traditional Chinese medicine immunosuppressants |
| | | Immunopotentiating agents | Immunopotentiating agents |
| | Antineoplastic drug | Antineoplastic agents | alkylating agents, anti-metabolic anti-tumor agents, anti-tumor antibiotics, plant-derived anti-tumor agents and their derivatives, anti-tumor hormone agents, anti-tumor targeted drugs, other anti-tumor agents and adjuvant therapy agents |
| | Vitamins, nutritional agents, enzyme-inhibiting agents, and agents used to regulate water, electrolyte, and acid-base balance | Vitamins | vitamin A or vitamin D agents, vitamin B agents, vitamin C and other vitamins |
| | | Enzymes and other biochemical preparations | enzyme agents, other biochemical preparations |
| | | Drugs used to regulate water, electrolyte, and acid-base balance | electrolyte balance regulators, acid-base balance regulators, other agents for regulating water or electrolyte or acid-base balance, compound electrolyte infusion and dialysis solution |
| | | Nutritional drugs | general enteral nutrition agents, disease-specific enteral nutrition agents, amino acid parenteral nutrition agents, fat emulsion parenteral nutrition agents, other types of parenteral nutrition agents |
| | Five sense organs, skin, and external medications | Drugs in ear, nose and throat diseases | agents for the treatment of glaucoma, agents for the treatment of dry eye, vascular endothelial growth factor inhibitor ophthalmic agents, agents for the treatment of cataract, other ophthalmic agents, otorhinolaryngological and dental agents |
| | | Dermatologic agents | anti-infective dermatological agents, disinfectant and antiseptic dermatological agents, skin cleansers, corticosteroid dermatological agents |
| | | Disinfectant, antiseptic, and astringent agents | disinfectant, antiseptic, and astringent agents |
| | Other types of drugs | Detoxification agents | detoxification agents for metal poisoning, detoxification agents for organophosphate poisoning, detoxification agents for cyanide poisoning, detoxification agents for organic fluorine poisoning, detoxification agents for benzodiazepine poisoning, detoxification agents for morphine poisoning, detoxification agents for acetaminophen poisoning and other detoxification agents |
| | | Drugs for the prevention and treatment of radiation sickness | drugs for the prevention and treatment of radiation sickness |

TABLE 3-continued

| Level 1 | Level 2 | Level 3 | Level 4 |
|---|---|---|---|
| | Diagnostic agents | Diagnostic agents | tract contrast media and intravascular drug delivery enhancement contrast media, gastrointestinal contrast media, bronchial contrast media, lymph contrast media, MRI contrast media, ultrasound contrast media, organ function examination and other diagnostic agents |
| | Biological products | Biological products | biological products for prevention, biological products for treatment, in vivo diagnostic reagents |
| Chinese patent drugs | Internal medicine medication | Formula for relieving superficies in internal medicine | formula for relieving superficies syndrome with pungent and warm natured drugs in internal medicine, formula for relieving superficies syndrome with pungent and cool natured drugs in internal medicine, formula for relieving both superficial and internal disorders in internal medicine, formula for strengthening body resistance and relieving superficies in internal medicine |
| | | Formula for dispelling summer heat in internal medicine | formula for dispelling summer heat to relieve exterior syndrome in internal medicine, formula for clearing summer-heat and removing damp in internal medicine, formula for strengthening stomach and relieving summer heat in internal medicine |
| | | Formula for promoting bowel movements in internal medicine | formula for clearing fire and promoting bowel movements in internal medicine, formula with purgative action in internal medicine, formula for eliminating fullness and promoting bowel movements in internal medicine |
| | | Formula for heat-clearing in internal medicine | formula for heat-clearing and purging pathogenic fire in internal medicine, formula for clearing heat and detoxicating in internal medicine, formula for clearing heat in viscerae in internal medicine, formula for clearing heat and sedating in internal medicine |
| | | Formula for warming interior in internal medicine | formula for warming interior to disperse cold in internal medicine, formula for warming interior to eliminate dampness in internal medicine, formula for restoring yang and rescuing patient from collapse in internal medicine |
| | | Formula for resolving phlegm, relieving cough, preventing asthma in internal medicine | formula for dissolving cold phlegm with warmth in internal medicine, formula for astringing lung to relieve cough in internal medicine, formula for clearing heat and resolving phlegm in internal medicine, formula for moistening lung to remove phlegm in internal medicine, anti-asthmatic agents for internal medicine, formula for eliminating stagnation and resolving phlegm in internal medicine |
| | | Formula for inducing resuscitation in internal medicine | formula for clearing heat and resuscitation in internal medicine, formula for aromatic or phlegm-reducing resuscitation in internal medicine |
| | | Astringent formula in internal medicine | formula for astringing spermatorrhea in internal medicine, formula for arresting discharges and antidiarrheal in internal medicine, formula for tonifying kidney to reduce urination in internal medicine |
| | | formula for strengthening the body resistance in internal medicine | formula for supplementing qi in internal medicine, formula for nourishing blood in internal medicine, formula for nourishing yin in internal medicine, formula for warming yang in internal medicine, formula for benefiting both yin and yang in internal medicine, formula for benefiting both qi and blood in internal medicine, formula for boosting qi and nourishing yin in internal medicine, formula for boosting qi and restoring pulse in internal medicine |
| | | Formula for tranquilizing in internal medicine | formula for tranquilizing by nourishing the heart in internal medicine, formula for boosting qi and nourishing blood for tranquillization in internal medicine, formula for removing heat from the liver for tranquillization in internal medicine, formula for tonifying kidney for tranquillization in internal medicine, formula |

TABLE 3-continued

| Level 1 | Level 2 | Level 3 | Level 4 |
|---|---|---|---|
| | | | for tranquilization with heavy material in internal medicine |
| | | Hemostatic agents for internal medicine | |
| | | Formula for clearing stasis in internal medicine | formula for benefiting qi and activating blood circulation in internal medicine, formula for activating qi flowing and activating blood circulation in internal medicine, formula for nourishing blood and activating blood circulation in internal medicine, formula for warming yang and promoting blood circulation in internal medicine, formula for nourishing yin and activating blood circulation in internal medicine, formula for nourishing kidney and activating blood circulation in internal medicine, formula for resolving phlegm and relaxing chest in internal medicine, formula for removing blood stasis and promoting qi circulation in internal medicine, formula for invigorating blood circulation and eliminating symptoms in internal medicine, formula for clearing stasis and sputum in internal medicine |
| | | Formula for regulating qi flow in internal medicine | formula for dispersing stagnated liver qi and relieving qi stagnation in internal medicine, formula for soothing liver and regulating stomach in internal medicine |
| | | Formula for resolving food stagnancy in internal medicine | |
| | | Formula for wind disorder in internal medicine | formula for dispersing external wind in internal medicine, formula for calming liver to stop endogenous wind in internal medicine, formula for suppressing hyperactive liver and subsiding yang in internal medicine, formula for eliminating phlegm and calming wind in internal medicine, formula for removing blood stasis and dispelling wind in internal medicine, formula for nourishing blood to expel wind in internal medicine, formula for dispelling wind and removing obstruction in the meridians in internal medicine |
| | | Formula for eliminating dampness in internal medicine | formula for dispelling cold and removing dampness in internal medicine, formula for dispelling wind and dampness in internal medicine, formula for removing blood stasis and dispelling dampness in internal medicine, formula for inducing diuresis to remove edema in internal medicine, formula for clearing heat and freeing strangury in internal medicine, formula for removing blood stasis and freeing strangury in internal medicine, formula for tonifying the body's righteousness and eliminating dampness in internal medicine |
| | | Formula for resolving turbidity and lowering lipid in internal medicine | |
| | Surgical medication | Formula for clearing heat in surgical medicine | formula for purging liver and gallbladder in surgical medicine, formula for clearing heat and removing toxicity in surgical medicine, formula for clearing heat and eliminating dampness in surgical medicine, formula for freeing strangury and dispersing stone in surgical medicine |
| | | Formula for warming meridians, regulating qi, promoting blood circulation, and dispersing lumps in surgical medicine | |
| | Tumor medication | Anti-tumor Chinese patent drugs | |
| | | Adjuvant Chinese patent drugs for tumor | |

TABLE 3-continued

| Level 1 | Level 2 | Level 3 | Level 4 |
|---|---|---|---|
| | Gynecological medication | Formula for regulating blood in gynecological medicine | formula for regulating qi and nourishing blood in gynecological medicine, formula for activating blood and removing stasis in gynecological medicine, gynecological hemostatic agent |
| | | Formula for clearing away heat in gynecological medicine | oral formula for clearing away heat in gynecological medicine, external formula for clearing away heat in gynecological medicine |
| | | Formula for tonifying the body's righteousness in gynecological medicine | |
| | | Formula for dissipating detumescence and lump in gynecological medicine | |
| | Ophthalmic medication | Formula for clearing away heat in ophthalmological medicine | |
| | | Formula for tonifying the body's righteousness in ophthalmological medicine | |
| | | Formula for removing blood stasis in ophthalmological medicine | |
| | | Formula for clearing away heat in ophthalmological medicine | |
| | Orthopedic medication | Formula for activating blood and removing stasis in orthopedic medicine | |
| | | Formula for promoting blood circulation to remove obstruction in collaterals in orthopedic medicine | |
| | | Formula for tonifying kidney and strengthening bone in orthopedic medicine | |
| | National medicines | Tibetan medicines | |
| | | Mongolian medicines | |
| | | Uyghur medicines | |

S3, based on the above dataset of ADR risk factors in elderly patients, and grounded in the medical institution's case records, experienced clinical pharmacists completed the identification and risk factor (feature) annotation of ADR in elderly patients, thereby constructing an ADR dataset for elderly patients.

Specifically, it comprised the following steps:

S31, the constructed ADR dataset for elderly patients had reached tens of thousands of cases, and the ADR discrimination was carried out according to the judgment criteria established by the National Center for ADR Monitoring, China.

S32, the judgment criteria established by the National Center for ADR Monitoring, China was followed. The specific judgment criteria were: 1) Definitely; 2) Very likely; 3) Possible; 4) Possibly unrelated; 5) To be evaluated; 6) Unable to evaluate. Medical records determined as definitely, very likely, and possibly were considered to have experienced ADRs.

S33, ADR was manually identified and annotated by many clinical pharmacists with over ten years of work experience.

S4, the ADR dataset of elderly patients was learned about to construct an ADR risk prediction model for them. Specifically, the data of ADR datasets for tens of thousands of elderly patients were used, and after removing features with missing values of >2000, M types of missing value handling methods were applied, including but not limited to no imputation, mean imputation, regression imputation, or missForest methods.

Classification was performed based on the above localized trigger entries, which were randomly divided into independent training and testing sets at a ratio of 8:2, and N types of machine learning models were used to conduct ADR prediction training, feature importance evaluation, and screening for elderly patients based on data from various categories It should be noted that in the prior art, those skilled in this field (such as doctors, pharmacists, researchers, etc.) were aware of the relationship between certain characteristics and ADRs in patients with aid of research and professional knowledge. However, due to factors such as the wide variety of drugs, individual differences among patients, and advancements in related medical research, it was impossible for them to provide a complete and optimal combination of features for each type of drug. Therefore, the way of inputting features in this example was to input all the features listed in step S2 into the model (for example, for the drug categories listed in step S2, based on whether the patient used the drug category, "Yes" or "No" could be used as the input value for input). During the model training process, the model algorithm determined the impact of various features on the prediction results.

The model training step employed a 10-fold cross-validation method to perform internal model validation on the training set and adjust model parameters, aiming to achieve the maximum AUC value for the training set. Using the 10-fold cross-validation method, each model obtained 10 different sets of machine learning evaluation metrics based on the training set. The best-performing models, totaling N×M, were selected for the test set. The superiority of each model was determined based on metrics such as AUC, accuracy, precision, recall, and F1 scores for the test set.

Example 2

The system of this example includes:
Feature data acquisition module, used for inputting the ADR-related feature data of the elderly patients and sending the ADR-related feature data of the elderly patients to the data acquisition and storage module;
  data acquisition and storage module, used for acquiring and storing ADR-related characteristic data of elderly patients;
  prediction module, used for integrating the ADR prediction model for elderly patients trained in Example 1, which was used to calculate the ADR-related feature data of elderly patients and obtain the prediction results of ADR occurrence in elderly patients;
  result output module, used for outputting the real-time prediction results from the prediction module, and forming an auxiliary decision-making tool for medication schemes.

The technical solution of the present invention was further illustrated with reference to the following experimental examples. The models in the following experimental examples were trained according to the method of Example 1, with the difference being the selection of some features (risk factors) or the choice of specific machine learning algorithms. Steps or parameters not specifically described in the following experimental examples were executed according to the records of Example 1.

Experimental Example 1 Screening Study on the Importance of Non-Drug Influencing Factors in Input Features 1. Experimental Methods This experimental example was pre-tested among thousands of patients treated with medication. After incorporating 23 non-drug influencing factors (see the left column of Table 5 for details), eXtreme Gradient Boosting (XGBoost), AdaBoost, CatBoost, Gradient Boosting Decision Tree (GBDT), Light Gradient Boosting Machine (LightGBM), Tree-based Pipeline Optimization Tool (TPOT), and Random Forest (RF) were used for analysis.

2. Experimental Results

As shown in FIG. 1 and Table 4, the results indicate that RF achieves the best performance. Therefore, RF was employed to rank the impact of non-drug influencing factors on ADR prediction. The ranking results are presented in Table 5, revealing that age, number of admission diagnoses, number of pre-admission hospitalizations, tumor disease, admission nursing level, and gender exerted the greatest influence on ADR prediction, while skin disease had the least impact.

TABLE 4

Model testing results.

| Models | Accuracy | Precision | Recall | F1 |
|---|---|---|---|---|
| LightGBM | 86.46% | 50.00% | 24.49% | 32.88% |
| GBDT | 86.94% | 50.00% | 38.30% | 43.37% |
| Adaboost | 85.00% | 42.55% | 42.55% | 42.55% |
| Catboost | 87.78% | 54.84% | 36.17% | 43.59% |
| XGboost | 85.00% | 39.39% | 27.66% | 32.50% |
| Random Forest | 88.89% | 73.33% | 23.40% | 35.48% |
| TPOT | 88.06% | 70.00% | 14.89% | 24.56% |

TABLE 5

The ranking of the impact of non-drug influencing factors.

| Non-drug influencing factors | Impact effectiveness score |
|---|---|
| Age | 0.27478 |
| Number of admission diagnoses | 0.2178 |
| Number of hospitalizations before admission | 0.1769 |
| Tumor disease | 0.04685 |
| Admission nursing level | 0.04472 |
| Gender | 0.04147 |
| Operation or not | 0.03713 |
| If there are drug allergy history | 0.02606 |
| Entering hospital condition | 0.0256 |
| Admission form | 0.01562 |
| Infectious diseases or parasitic diseases | 0.01401 |
| Circulation system disease | 0.01129 |
| Digestive system disease | 0.01035 |
| Neurological or psychiatric disorders | 0.00909 |
| Urogenital diseases | 0.0068 |
| Diseases of the musculoskeletal system or connective tissue | 0.00662 |
| Diseases of the blood or hematopoietic organs | 0.00595 |
| Endocrine or metabolic diseases | 0.00582 |
| Respiratory system diseases | 0.00385 |
| Diseases of the eye or ear | 0.00337 |
| Immune system diseases | 0.00305 |
| Injury or poisoning | 0.00247 |
| Skin diseases | 0.00081 |

Experimental Example 2 Screening of Machine Learning Model Algorithms Considering Non-Drug Influencing Factors+Drug-Induced Influencing Factors 1. Experimental Methods Based on experimental example 1, this experimental example incorporated 23 non-drug influencing factors (see Table 5) and factors related to medication use (including the number of drug types, frequency of medication use, and drug categories, as detailed in the description of medication use in Example 1) as input features. Analysis was conducted using eXtreme Gradient Boosting (XGBoost), AdaBoost, CatBoost, Gradient Boosting Decision Tree (GBDT), Light Gradient Boosting Machine (LightGBM), Tree-based Pipeline Optimization Tool (TPOT), and Random Forest (RF).

2. Experimental Results

Figure 2:
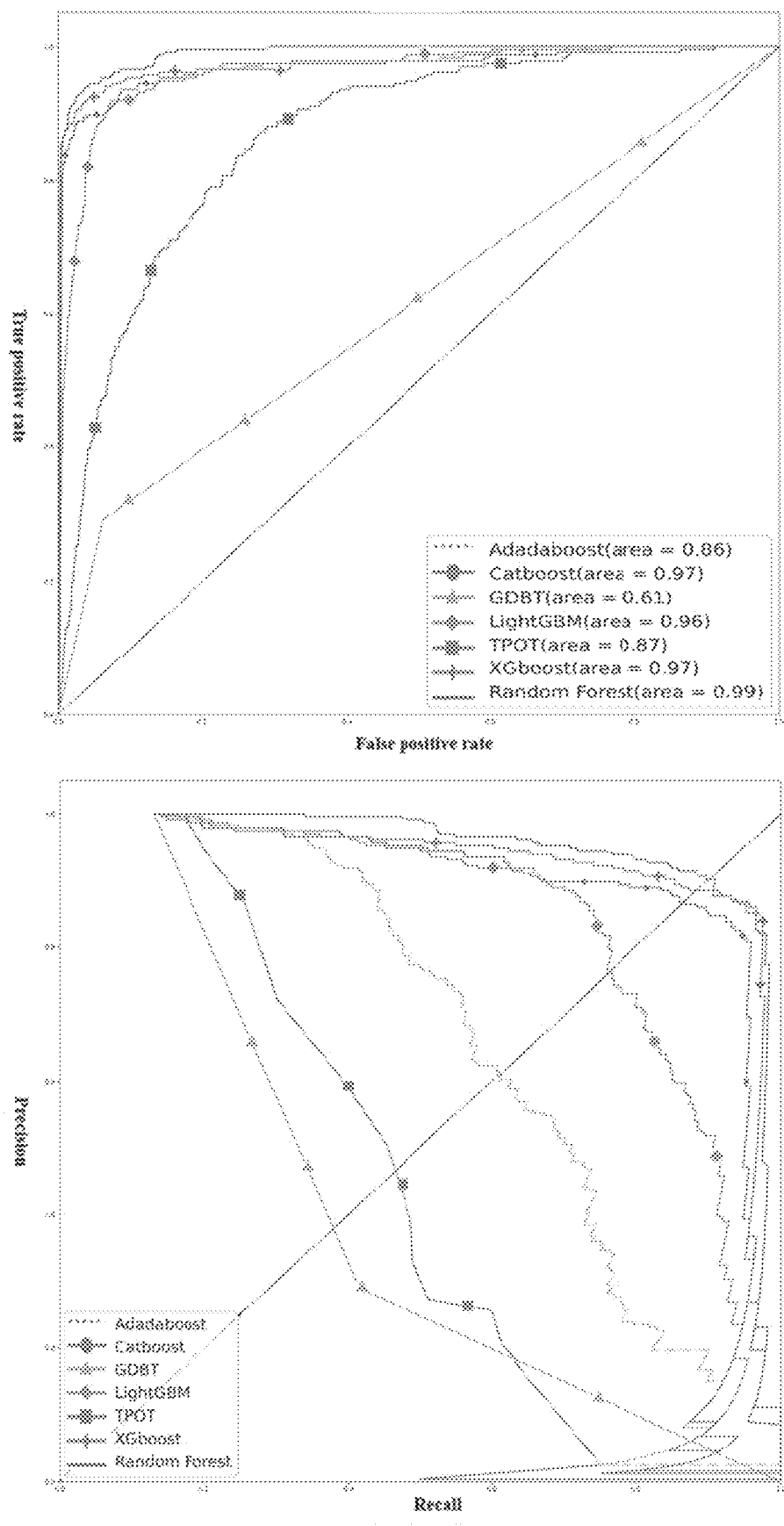
FIG. 2. The visualization results of different machine learning models in Example 2; wherein, (A) is the Receiver Operating Characteristic (ROC) curve, and (B) is the precision-recall curve, with "AUC" representing the area under the ROC curve.

The experimental results, as shown in FIG. 2 and Table 6, indicate that the boosting-based ensemble learning models perform well, with Catboost demonstrating the best overall performance. Therefore, boosting ensemble learning models were superior machine learning model algorithms for predicting ADRs in elderly patients.

Experimental Example 3 Screening Study on the Importance of Drug Categories in the Input Features for Drug-Induced Influencing Factors (Medication Use)

1. Experimental Methods

Taking drug-induced liver injury as an example, we extracted tens of thousands of cases of drug treatment from patients, among which 480 cases developed drug-induced liver injury. We then conducted a statistical analysis on these cases.

2. Experimental Results

As shown in Table 7, a total of 73 types of drugs were involved in drug-induced liver injury; since one ADR may involve multiple drugs simultaneously, the cumulative frequency of triggering ADRs by drugs was 684 times.

TABLE 7

Key categories of drugs that cause drug-induced liver injury.

| Categories | Number |
| --- | --- |
| Penicillin antibiotics | 83 |
| Heparin-based anticoagulants | 76 |
| Cephalosporin antibiotics | 68 |
| Antipyretic-analgesic and anti-inflammatory drugs | 45 |
| Other β-lactam antibiotics | 44 |
| Carbapenem antibiotics | 40 |
| Proton pump inhibitors for suppressing gastric acid secretion | 30 |
| Quinolone antimicrobial agents | 30 |
| Alkylating agent | 23 |
| Azole antifungals | 20 |
| Drugs affecting cholesterol synthesis | 17 |
| Dopamine or serotonin receptor-based antiemetic drugs | 15 |
| Other antiepileptic drugs | 14 |
| Antimetabolite antitumor drugs | 12 |
| Tetracycline antibiotics | 12 |
| Glycopeptide antibiotics | 12 |
| Glucocorticoid drugs | 10 |
| Antibacterial drugs for Mycobacterium tuberculosis | 10 |
| Intravenous general anesthetics | 9 |
| Traditional Chinese medicine-based immunosuppressants | 8 |
| Echinocandin antifungal drugs | 7 |
| Opioid analgesics | 6 |
| Other antibacterial antibiotics | 5 |
| Antiepileptic drugs for absence seizures | 5 |
| Parenteral nutrition drug of fat emulsion type | 4 |
| Mucus dissolving agent | 4 |
| Antiherpesvirus drug | 4 |
| Antitumor drugs derived from plants and their derivatives | 4 |
| Immune enhancers | 4 |

TABLE 7-continued

Key categories of drugs that cause drug-induced liver injury.

| Categories | Number |
| --- | --- |
| Aminoglycoside antibiotics | 3 |
| Sulfonamide antibiotics | 3 |
| Broad-spectrum antiviral drugs | 3 |
| Vitamin K antagonist anticoagulants | 3 |
| Selective serotonin and norepinephrine reuptake inhibitors | 3 |
| Antitumor antibiotics | 3 |
| Antiarrhythmic drugs by prolonging the duration of action potential | 2 |
| α-receptor antagonist | 2 |
| Benzodiazepine sedative-hypnotic and anticonvulsant agents | 2 |
| Prokinetic agents | 2 |
| Oxazolidinone antibacterial agents | 2 |
| Renin-inhibiting antihypertensive drugs | 2 |
| Lincomycin antibiotics | 2 |
| Other anticoagulants | 2 |
| Other sedative-hypnotic and anticonvulsant drugs | 2 |
| Anti-tumor targeted drugs | 3 |
| Other anti-anemia drugs | 1 |
| Selective serotonin reuptake inhibitor antidepressants | 1 |
| H2 receptor blocker | 1 |
| Polyene antifungal drugs | 1 |
| New structural antipsychotic drugs | 1 |
| Iodinated contrast media | 1 |
| Anti-gout drugs by promoting urinary acid excretion | 1 |
| Muscle relaxants | 1 |
| Antileukotriene anti-asthma drugs | 1 |
| Cyclopyrrolidone sedative-hypnotic and anticonvulsant drugs | 1 |
| Anti-platelet agents | 1 |
| Other types of antimanic drugs | 1 |
| Diuretic antihypertensive drugs | 1 |
| Polyclonal or monoclonal antibody-based immunosuppressants | 1 |
| Anti-proliferative agents | 1 |
| Drugs affecting lipoprotein transport and decomposition | 1 |
| Cardiac glycoside agents | 1 |
| Antiresorptive drugs | 1 |
| Iron-based anti-anemia drugs | 1 |
| Vitamin C and other vitamins | 1 |
| Selective serotonin reuptake inhibitor antidepressants | 1 |
| Premixed insulin | 1 |
| Histamine release inhibitor anti-asthmatic drugs | 1 |

As shown in the table, the results indicated that the following drugs were most commonly associated with drug-induced liver injury: penicillin antibiotics, heparin anticoagulants, cephalosporin antibiotics, antipyretic-analgesic and anti-inflammatory drugs, other β-lactam antibiotics, carbapenem antibiotics, proton pump inhibitors for suppressing gastric acid secretion, quinolone antimicrobial agents, alkylating agents, azole antifungals, drugs affecting cholesterol synthesis, dopamine or serotonin receptor-based anti-emetic drugs, other anti-epileptic drugs, anti-metabolite antitumor drugs, tetracycline antibiotics, glycopeptide antibiotics, glucocorticoids, and bactericidal agents for *Mycobacterium tuberculosis*. Therefore, when using the method of Example 1 to predict ADRs in elderly patients, and specifically limiting the type of ADR to drug-induced liver injury, the medication use of the above drug types was a priority risk factor.

As evident from the above examples and experimental examples, the prediction model and system provided in the present invention were capable of evaluating and predicting the ADR risks associated with existing or alternative medication regimens for elderly patients. By analyzing the safety prediction outcomes of different medication regimens, this system aids doctors in making medication decisions. Consequently, the present invention holded promising clinical applications.

The invention claimed is:
1. A method for avoiding adverse drug reaction (ADR) elderly patients, comprising:
acquiring ADR data from elderly patients;
constructing an ADR prediction model for elderly patients based on the ADR data;
calculating the ADR-related characteristic data of the elderly patients, thereby predicting ADR occurrence in elderly patients; and
determining a medication plan for a target elderly patient using the prediction results, wherein the step of constructing the ADR predication model comprises:
S1: constructing an ADR trigger entries for elderly patients selected from laboratory results, rescue medication use, symptoms, and blood drug concentration;
S2: based on the ADR trigger entries for elderly patients, selecting ADR risk factors and constructing a dataset of ADR risk factors related to ADR triggers for elderly patients;
S3: completing the risk factor annotation and ADR discrimination for the dataset of ADR risk factors in elderly patients related to the ADR triggers; and
S4: training a machine learning model using the dataset information annotated in S3 to obtain an ADR risk prediction model for elderly patients; and
S5: using the machine learning model to rank effectiveness of non-drug influencing factors in predicting ADRs,
wherein the non-drug influencing factors comprises age, number of hospital admissions, number of hospitalizations before admission, level of nursing care upon admission, gender, whether surgery was performed, whether there is a history of drug allergy, admission condition, admission method, and main diagnostic classification,
wherein the main diagnostic classification are selected from tumor diseases, infectious diseases or parasitic diseases, circulatory system diseases, digestive system diseases, neurological or psychiatric diseases, urogenital system diseases, musculoskeletal system or connective tissue diseases, blood or hematopoietic organ diseases, endocrine or metabolic diseases, respiratory system diseases, eye or ear diseases, immune system diseases, injury or poisoning, and skin diseases.

2. The method according to claim 1, wherein the ADR risk factors comprises medication situation, and the medication situation includes the number of medication types, medication frequency, and drug categories, The drug categories include at least one of the following types: penicillin antibiotics, cephalosporin antibiotics, β-lactamase inhibitors and their compound formulations with β-lactam antibiotics, carbapenems and other β-lactam antibiotics, aminoglycoside antibiotics, tetracycline antibiotics, macrolide antibiotics, lincomycin antibiotics, glycopeptide antibiotics, other antibacterial antibiotics, sulfonamide antibiotics, trimethoprim antibacterial drugs, nitrofuran antibacterial drugs, quinolone antibacterial drugs, nitroimidazole antibacterial drugs, oxazolidinone antibacterial drugs, bactericidal drugs for *Mycobacterium tuberculosis*, bacteriostatic drugs for *Mycobacterium tuberculosis*, polyene antifungal drugs, azole antifungal drugs, allylamine antifungal drugs, echinocandin antifungal drugs, pyrimidine antifungal drugs, broad-spectrum antiviral drugs, antiretroviral drugs, anti-herpes virus drugs, anti-influenza virus drugs, anti-hepatitis virus drugs, drugs for controlling malaria symptoms, drugs for preventing the spread and prevention of malaria, anti-amoebic drugs, anti-*trichomonas* drugs, anti-leishmaniasis drugs, other antiprotozoal drugs, anti-schistosomiasis drugs, drugs against other trematodes, anti-filarial drugs, anthelmintics, broad-spectrum anthelmintics and insecticides, anlitapeworm, other anthelmintics, resuscitative central nervous system stimulants, psychostimulant central nervous system stimulants, central nervous system stimulants promoting brain metabolism, opioid analgesics, non-opioid analgesics, formic acid antipyretic-analgesic and anti-inflammatory drugs, acetic acid antipyretic-analgesic and anti-inflammatory drugs, propionic acid antipyretic-analgesic and anti-inflammatory drugs, fenamic acid antipyretic-analgesic and anti-inflammatory drugs, pyrazolone antipyretic-analgesic and anti-inflammatory drugs, aniline-based antipyretic-analgesic, and anti-inflammatory drugs, sulfonylanilide antipyretic-analgesic and anti-inflammatory drugs, oxicam antipyretic-analgesic and anti-inflammatory drugs, coxib antipyretic-analgesic and anti-inflammatory drugs, other antipyretic-analgesic and anti-inflammatory drugs, anti-gout drugs inhibiting granulocyte infiltration, anti-gout drugs promoting uric acid excretion, anti-gout drugs inhibiting uric acid production, anti-epileptic drugs regulating sodium channels, anti-epileptic drugs regulating γ-aminobutyric acid, anti-epileptic drugs for absence seizures, other anti-epileptic drugs, benzodiazepine sedative hypnotics and anticonvulsants, barbiturate sedative hypnotics and anticonvulsants, aldehyde sedative hypnotics and anticonvulsants, cyclopyrrolidone sedative hypnotics and anticonvulsants, other sedative hypnotics and anticonvulsants, DA precursor antiparkinsonian drugs, peripheral dopamine decarboxylase inhibitor antiparkinsonian drugs, catechol-O-methyltransferase inhibitor antiparkinsonian drugs, central DA receptor agonist antiparkinsonian drugs, anticholinergic antiparkinsonian drugs, monoamine oxidase-B inhibitor antiparkinsonian drugs, other antiparkinsonian drugs, phenothiazine antipsychotics, butyrophenone antipsychotics, thioxanthene antipsychotics, benzamide antipsychotics, novel structural antipsychotics, long-acting antipsychotics, benzodiazepine anxiolytics, non-benzodiazepine anxiolytics, lithium salt antimanic drugs, other antimanic drugs, tricyclic antidepressants, monoamine oxidase inhibitor antidepressants, selective 5-hydroxytryptamine reuptake inhibitor antidepressants, selective norepinephrine reuptake inhibitor antidepressants, selective 5-hydroxytryptamine and norepinephrine reuptake inhibitor antidepressants, norepinephrine and specific serotoninergic antidepressants, selective serotonin reuptake activator antidepressants, central nervous system stimulant antidepressants, other types of antidepressants, thrombolytic cerebrovascular drugs, anti-platelet aggregation cerebrovascular drugs, free radical scavenging cerebrovascular drugs, calcium antagonist cerebrovascular drugs, vasodilator cerebrovascular drugs acting directly on vascular smooth muscle, cerebrovascular drugs improving microcirculation and reducing blood viscosity, cerebrovascular drugs improving brain metabolism, other types of cerebrovascular drugs, cholinesterase inhibitor anti-senile dementia and brain metabolism improvement agents, NMDA receptor antagonist anti-senile dementia and brain metabolism improvement agents, pyrrolidone brain metabolism activators, agents enhancing brain oxygen or glucose or energy metabolism for anti-senile dementia and brain metabolism improvement, other types of anti-senile dementia and brain metabolism improvement agents, inhalational general anesthetics, intravenous general anesthetics, ester local anesthetics, amide local anesthetics, other types of local anesthetics, skeletal muscle relaxants, direct-acting cholinomimetic agents, anti-cholinesterase cholinomimetic agents, muscarinic receptor antagonist anticholinergic agents, nicotinic receptor antagonist anticholinergic agents, adrenergic drugs, αβ-receptor antagonists, α-receptor antagonists, β-receptor antagonists, selective calcium channel blockers, non-selective calcium channel blockers, cardiac glycosides, non-glycoside positive inotropic agents, enkephalin inhibitors, sodium channel blocker antiarrhythmic agents, β-receptor blockers, action potential prolongation antiarrhythmic agents, calcium channel blockers, nitrate anti-anginal agents, nitrite anti-anginal agents, other anti-anginal agents, calcium channel blocker peripheral vasodilator, peripheral vasodilators by directly dilating small vascular smooth muscles, renin inhibitor antihypertensive agents, ACEI antihypertensive agents, ARB antihypertensive agents, diuretics antihypertensive agents, calcium channel blocker antihypertensive agents, peripheral vasodilator antihypertensive agents, calcium channel opener antihypertensive agents, central antihypertensive agents, adrenergic receptor antagonist antihypertensive agents, antihypertensive agents affecting sympathetic neurotransmitters, ganglionic blocker antihypertensive agents, adrenergic anti-shock vasoactive agents, other anti-shock vasoactive agents, agents affecting cholesterol synthesis, agents affecting cholesterol absorption and transport, agents affecting lipoprotein transport and decomposition, antioxidant lipid-regulating agents, polyunsaturated fatty acid lipid-regulating agents, nauseating expectorants and irritating expectorants, mucolytic agents, mucus diluents, central cough suppressants, peripheral cough suppressants, β-adrenergic receptor agonist bronchodilators, M-cholinergic receptor antagonist bronchodilators, xanthine bronchodilators, histamine release inhibitor bronchodilators, adrenocortical hormone bronchodilators, anti-leukotriene bronchodilators, antacids, H2 receptor antagonist gastric acid secretion inhibitors, proton pump inhibitor gastric acid secretion inhibitors, selective anticholinergic gastric acid secretion inhibitors, gastrin receptor antagonist gastric acid secretion inhibitors, colloidal bismuth gastric mucosal protectants, prostaglandins and their derivatives gastric mucosal protectants, other agents for treating peptic ulcers, agents for eradicating *Helicobacter pylori*, gastrointestinal motility drugs, M-receptor antagonist gastrointestinal spasmolytics, other types of gastrointestinal spasmolytics, digestants, gastro-kinetic agents, thiazide antiemetic agents, antihistamine antiemetic agents, dopamine or 5-hydroxytryptamine receptor antiemetic agents, other types of antiemetic agents, emetics, bulking laxatives, irritant laxatives, lubricating laxatives, softening laxatives, antidiarrheal agents, probiotics, prebiotics, synbiotics, cell regeneration-promoting agents, transaminase-lowering and hepatoprotective agents, choleretic and hepatoprotective agents, basic metabolic agents for hepatic and cholalic diseases, detoxification and hepatoprotective agents, anti-inflammatory and hepatoprotective agents, antiviral agents for hepatic and cholalic diseases, 5-aminosalicylic acids for inflammatory bowel diseases, other agents for inflammatory bowel diseases, other digestive system drugs, agents for promoting blood coagulation system function, coagulation factor preparations, agents for inhibiting fibrinolytic system, hemostatic agents acting on blood vessels, agents for promoting thrombocytopoiesis, other coagulants, heparin anticoagulants, vitamin K antagonist anticoagulants, citrate anticoagulants, fibrinolytic agents, direct factor IIa inhibitors, direct factor Xa inhibitors, antiplatelet agents, other anticoagulants, plasma and plasma substitutes, iron anti-anemia agents, folic acid anti-anemia agents, other anti-anemia agents, traditional leukocyte growth-promoting agents, biological products for leukocyte growth promotion, plant extracts for leukocyte growth promotion, antiplatelet agents, loop diuretics, thiazine diuretics, potassium-sparing diuretics and carbonic anhydrase inhibitors, acidic salt diuretics, xanthine compound diuretics, agents for the treatment of diabetes insipidus, α receptor antagonists for the treatment of benign prostatic hyperplasia, 5α reductase inhibitors for the treatment of benign prostatic hyperplasia, androgen receptor antagonist drugs for the treatment of benign prostatic hyperplasia, posterior pituitary uterotonic agents, ergot uterotonic agents, prostaglandin uterotonic agents, agents promoting cervical ripening, anti-preterm labor agents, dopamine receptor agonist lactation-reducing agents, estrogen lactation-reducing agents, pituitary hormones and related agents, glucocorticoid agents, mineralocorticoid agents, weak androgenic agents, androgenic and anabolic agents, estrogenic agents, progestogenic agents, estrogen receptor modulators, gonadotropin agents, short-acting oral contraceptives, long-acting contraceptives, external contraceptives, male contraceptives, glucagon, ultra-short-acting insulin, short-acting insulin, medium-acting insulin, long-acting insulin, ultra-long-acting insulin, pre-mixed insulin, sulfonylurea hypoglycemic agents, insulin secretagogue hypoglycemic agents, α-glucosidase inhibitor hypoglycemic agents, biguanide hypoglycemic agents, thiazolidinedione hypoglycemic agents, DDP-4 inhibitor hypoglycemic agents, SGLT-2 inhibitor hypoglycemic agents, GLP-1 inhibitor hypoglycemic agents, anti-obesity agents, thyroid hormone agents, anti-thyroid agents, bone resorption inhibitors, bone formation promoters, drugs for hyperosteogeny, antihistamines, agents for blocking histamine release, other anti-allergic agents, calcineurin inhibitors, anti-proliferative agents, polyclonal or monoclonal antibody immunosuppressants, traditional Chinese medicine immunosuppressants, immune enhancers, alkylating agents, antimetabolic anti-tumor agents, anti-tumor antibiotics, plant-derived anti-tumor agents and their derivatives, anti-tumor hormone agents, anti-tumor targeted drugs, other anti-tumor agents and adjuvant therapy agents, vitamin A or vitamin D agents, vitamin B agents, vitamin C and other vitamins, enzyme agents, other biochemical preparations, electrolyte balance regulators, acid-base balance regulators, other agents for regulating water or electrolyte or acid-base balance, compound electrolyte infusion and dialysis solution, general enteral nutrition agents, disease-specific enteral nutrition agents, amino acid parenteral nutrition agents, fat emulsion parenteral nutrition agents, other types of parenteral nutrition agents, agents for the treatment of glaucoma, agents for the treatment of dry eye, vascular endothelial growth factor inhibitor ophthalmic agents, agents for the treatment of cataract, other ophthalmic agents, otorhinolaryngological and dental agents, anti-infective dermatological agents, disinfectant and antiseptic dermatological agents, skin cleansers, corticosteroid dermatological agents, disinfectant and antiseptic astringents, detoxification agents for metal poisoning, detoxification agents for organophosphate poisoning, detoxification agents for cyanide poisoning, detoxification agents for organic fluorine poisoning, detoxification agents for benzodiazepine poisoning, detoxification agents for morphine poisoning, detoxification agents for acetaminophen poisoning and other detoxification agents, agents for the prevention and treatment of radiation sickness, tract contrast media and intravascular drug delivery enhancement contrast media, gastrointestinal contrast media, bronchial contrast media, lymph contrast media, MRI contrast media, ultrasound contrast media, organ function examination and other diagnostic agents, biological products for prevention, biological products for treatment, in vivo diagnostic reagents, formula for relieving superficies syndrome with pungent and warm natured drugs in internal medicine, formula for relieving superficies syndrome with pungent and cool natured drugs in internal medicine, formula for relieving both superficial and internal disorders in internal medicine, formula for strengthening body resistance and relieving superficies in internal medicine, formula for dispelling summer heat to relieve exterior syndrome in internal medicine, formula for clearing summer-heat and removing damp in internal medicine, formula for strengthening stomach and relieving summer heat in internal medicine, formula for clearing fire and promoting bowel movements in internal medicine, formula with purgative action in internal medicine, formula for eliminating fullness and promoting bowel movements in internal medicine, formula for heat-clearing and purging pathogenic fire in internal medicine, formula for clearing heat and detoxicating in internal medicine, formula for clearing heat in viscerae in internal medicine, formula for clearing heat and sedating in internal medicine, formula for warming interior to disperse cold in internal medicine, formula for warming interior to eliminate dampness in internal medicine, formula for restoring yang and rescuing patient from collapse in internal medicine, formula for dissolving cold phlegm with warmth in internal medicine, formula for astringing lung to relieve cough in internal medicine, formula for clearing heat and resolving phlegm in internal medicine, formula for moistening lung to remove phlegm in internal medicine, anti-asthmatic agents for internal medicine, formula for eliminating stagnation and resolving phlegm in internal medicine, formula for clearing heat and resuscitation in internal medicine, formula for aromatic or phlegm-reducing resuscitation in internal medicine, formula for astringing spermatorrhea in internal medicine, formula for arresting discharges and antidiarrheal in internal medicine, formula for tonifying kidney to reduce urination in internal medicine, formula for supplementing qi in internal medicine, formula for nourishing blood in internal medicine, formula for nourishing yin in internal medicine, formula for warming yang in internal medicine, formula for benefiting both yin and yang in internal medicine, formula for benefiting both qi and blood in internal medicine, formula for boosting qi and nourishing yin in internal medicine, formula for boosting qi and restoring pulse in internal medicine, formula for tranquilizing by nourishing the heart in internal medicine, formula for boosting qi and nourishing blood for tranquillization in internal medicine, formula for removing heat from the liver for tranquillization in internal medicine, formula for tonifying kidney for tranquillization in internal medicine, formula for tranquilization with heavy material in internal medicine, hemostatic agents for internal medicine, formula for benefiting qi and activating blood circulation in internal medicine, formula for activating qi flowing and activating blood circulation in internal medicine, formula for nourishing blood and activating blood circulation in internal medicine, formula for warming yang and promoting blood circulation in internal medicine, formula for nourishing yin and activating blood circulation in internal medicine, formula for nourishing kidney and activating blood circulation in internal medicine, formula for resolving phlegm and relaxing chest in internal medicine, formula for removing blood stasis and promoting qi circulation in internal medicine, formula for invigorating blood circulation and eliminating symptoms in internal medicine, formula for clearing stasis and sputum in internal medicine, formula for dispersing stagnated liver qi and relieving qi stagnation in internal medicine, formula for soothing liver and regulating stomach in internal medicine, formula for resolving food stagnancy in internal medicine, formula for dispersing external wind in internal medicine, formula for calming liver to stop endogenous wind in internal medicine, formula for suppressing hyperactive liver and subsiding yang in internal medicine, formula for eliminating phlegm and calming wind in internal medicine, formula for removing blood stasis and dispelling wind in internal medicine, formula for nourishing blood to expel wind in internal medicine, formula for dispelling wind and removing obstruction in the meridians in internal medicine, formula for dispelling cold and removing dampness in internal medicine, formula for dispelling wind and dampness in internal medicine, formula for removing blood stasis and dispelling dampness in internal medicine, formula for inducing diuresis to remove edema in internal medicine, formula for clearing heat and freeing strangury in internal medicine, formula for removing blood stasis and freeing strangury in internal medicine, formula for tonifying the body's righteousness and eliminating dampness in internal medicine, formula for resolving turbidity and lowering lipid in internal medicine, formula for purging liver and gallbladder in surgical medicine, formula for clearing heat and removing toxicity in surgical medicine, formula for clearing heat and eliminating dampness in surgical medicine, formula for freeing strangury and dispersing stone in surgical medicine, formula for warming meridians, regulating qi, promoting blood circulation, and dispersing lumps in surgical medicine, anti-tumor Chinese patent drugs, adjuvant Chinese patent drugs for tumor, formula for regulating qi and nourishing blood in gynecological medicine, formula for activating blood and removing stasis in gynecological medicine, gynecological hemostatic agent, oral formula for clearing away heat in gynecological medicine, external formula for clearing away heat in gynecological medicine, formula for tonifying the body's righteousness in gynecological medicine, formula for dissipating detumescence and lump in gynecological medicine, formula for clearing away heat in ophthalmological medicine, formula for tonifying the body's righteousness in ophthalmological medicine, formula for removing blood stasis in ophthalmological medicine, formula for clearing away heat in ophthalmological medicine, formula for activating blood and removing stasis in orthopedic medicine, formula for promoting blood circulation to remove obstruction in collaterals in orthopedic medicine, formula for tonifying kidney and strengthening bone in orthopedic medicine, Tibetan medicine, Mongolian medicine, and Uyghur medicine.

3. The method according to claim 1, wherein, in S3, during the annotation process, the identification of ADRs is carried out based on judgment criteria established by the National Center for ADR Monitoring, China.

4. The method according to claim 1, wherein, in S4, before using the annotated dataset to train the machine learning model, preprocessing data by deleting features with missing values greater than 20%, and using at least one method for handling missing values, wherein the at least one method for handling missing values is no imputation, mean imputation, regression imputation, or missForest method.

5. The method according to claim 1, wherein the machine learning model uses an algorithm selected from XGBoost, AdaBoost, CatBoost, GBDT, LightGBM, TPOT, and random forest.

6. The method according to claim 1, wherein the ADR risk factors comprises age, number of admission diagnoses, number of hospitalizations before admission, tumor disease, level of nursing care upon admission, gender, number of drug types, frequency of medication administration, and drug category;

the algorithm of the machine learning model is a boosting ensemble learning model.

7. The method according to claim 1, wherein the ADR risk factors comprises age, number of admission diagnoses, number of hospitalizations before admission, tumor disease, level of nursing care upon admission, and gender; and the algorithm of the machine learning model is Random Forest.

\* \* \* \* \*